United States Patent
Maskeri Rama et al.

(10) Patent No.: US 8,566,787 B2
(45) Date of Patent: Oct. 22, 2013

(54) SYSTEM AND METHOD FOR IMPROVING MODULARITY OF LARGE LEGACY SOFTWARE SYSTEMS

(75) Inventors: Girish Maskeri Rama, Bangalore (IN); Santonu Sarkar, Bangalore (IN)

(73) Assignee: Infosys Limited (IN)

( * ) Notice: Subject to any disclaimer, the term of this patent is extended or adjusted under 35 U.S.C. 154(b) by 1146 days.

(21) Appl. No.: 12/283,747

(22) Filed: Sep. 15, 2008

(65) Prior Publication Data

US 2010/0070948 A1 Mar. 18, 2010

(51) Int. Cl.
*G06F 9/44* (2006.01)

(52) U.S. Cl.
USPC ........... 717/109; 717/110; 717/120; 717/140; 717/149; 717/151

(58) Field of Classification Search
None
See application file for complete search history.

(56) References Cited

U.S. PATENT DOCUMENTS

| | | | |
|---|---|---|---|
| 6,757,639 B2 * | 6/2004 | Kataoka | 702/181 |
| 6,807,548 B1 * | 10/2004 | Kemper | 1/1 |
| 7,370,318 B1 * | 5/2008 | Howe et al. | 717/110 |
| 2004/0015828 A1 * | 1/2004 | MacKaie | 717/104 |
| 2004/0031015 A1 * | 2/2004 | Ben-Romdhane et al. | 717/107 |
| 2005/0149811 A1 | 7/2005 | Lubow | |
| 2006/0041873 A1 * | 2/2006 | Pandarinathan et al. | 717/141 |
| 2006/0053410 A1 * | 3/2006 | Charisius et al. | 717/109 |
| 2007/0055959 A1 * | 3/2007 | Eckardt et al. | 717/126 |
| 2007/0074149 A1 * | 3/2007 | Ognev et al. | 717/101 |
| 2007/0283325 A1 * | 12/2007 | Kumar et al. | 717/122 |
| 2008/0052684 A1 * | 2/2008 | Bowdidge et al. | 717/136 |
| 2009/0031310 A1 * | 1/2009 | Lev et al. | 718/101 |

* cited by examiner

*Primary Examiner* — Isaac Tecklu
(74) *Attorney, Agent, or Firm* — Lerner, David, Littenberg, Krumholz & Mentlik, LLP

(57) ABSTRACT

A system and method for improving modularity of a software source code is provided. The system comprises of a user interface for receiving source code; a source code model extractor for parsing and forming a model of the source code; a source code model database for storing the source code model, refactoring operators, and a record of refactoring changes; a modularity improvement analyzer for reading the source code model and modularity problem diagnosis data and generating a set of prescriptions; an optimal improvement suggestion selector for evaluating and selecting prescriptions; and a refactoring engine for receiving selected prescriptions and applying them on the source code.

32 Claims, 16 Drawing Sheets

US 8,566,787 B2

SYSTEM AND METHOD FOR IMPROVING MODULARITY OF LARGE LEGACY SOFTWARE SYSTEMS

BACKGROUND OF THE INVENTION

The present invention relates generally to system and method for improving quality of large legacy software systems and more specifically to provide prescriptive suggestions for improving modularity of a software system.

Large software systems are generally developed systematically using structured development methodology. Amongst various aspects employed during development of software systems, one common aspect is to arrange entire software into multiple logical modules. Modules are logical grouping of software code, functions and related data structures that collectively perform a specific task or service.

Even though modular design guidelines are easy to implement at the start of a new project, however, design guidelines are grossly violated as software evolves. Also, when numerous programmers are involved with the process of editing or writing a code for a single application, one programmer may be required to edit unfamiliar code that was drafted by another. Due to programmer's unfamiliarity with a code, coding errors in the unfamiliar code may not be easily recognized. Thus, there exist many significant applications in business and commerce world with millions of lines of code that is difficult to maintain due to outsized violation of modular design principles.

Organizations maintaining large software systems spend considerable amount of time, effort, and money in running these systems. Further, considerable amount of abovementioned resources are wasted if there is a need to modify a specific module or enhance the system.

Conventional tools may help in understanding a program flow and in assessing impact on a software system if a change in software is performed. However, by observing certain tacit indicators such as overall difficulty in understanding a module or amount of time required for a minor change etc. one can infer that there is a need for an improved method and system. Moreover, the conventional tools are not adequate enough to identify which specific modules, functions, and data structures of the software system/application are causing deterioration and what steps should be taken to improve modularity of a software system.

In addition, improving modularity of a software system is a challenging and time consuming task requiring skills of a domain expert. Further, manual remedies provided by conventional tools may not be time efficient and may also be prone to human errors. Furthermore, due to multiple environments from where data is fetched there is always a need of highly skilled resource to assess the readiness and effort required for improving modularity. The problem is exacerbated by the fact that the original authors of the code are often not available and the huge code base exists with little or no documentation. Moreover, the cost and efforts involved in procuring such resources for different environment makes the entire process arduous and infeasible.

Consequently, there is a need for an efficient system and method for assessing and improving the modularity of a software system. Further, there is a need for system and method to prevent further degradation of modularity when a software system is being developed. Furthermore, there is a need for a software tool that recommends prescriptions/remedies and evaluates its effect on modularity without actually implementing the changes in the software system.

SUMMARY OF THE INVENTION

A system for improving modularity of a software source code is provided. The system comprises a user interface for receiving a source code, a source code model extractor for parsing and forming a model of source code, a source code model database for storing the source code model, refactoring operators, and a record of refactoring changes. The system also comprises a modularization diagnosis reader for evaluating modularity of the source code and generating a modularity problem diagnosis data. The system further comprises a modularity improvement analyzer for reading source code model and modularity problem diagnosis data and generating a set of prescriptions, an optimal improvement suggestion selector for evaluating and selecting prescriptions, a refactoring engine for receiving selected prescriptions and applying them on source code, and a model annotator module for reflecting modularity defects on graphs via colored nodes and edges. The nodes and edges are colored with different strengths depending upon the number and severity of modularity defects.

In an embodiment of the present invention, source code model comprise file information, function information, function dependency information, global variable information, data structure information, dependency between global variables and functions, data structures and functions, and other programming constructs.

In an embodiment of the present invention, modularization diagnosis reader applies the extracted source code model and architectural description document of the source code for evaluating modularity of the source code. Multiple metrics are used to evaluate the modularity of source code from various perspectives such as structure, size, concept, and architecture.

In an embodiment of the present invention, modularity improvement analyzer further comprises a structural modularity improvement analyzer for examining modularity problem diagnosis data and a list of prescription from structural perspective, a size modularity improvement analyzer for examining modularity problem diagnosis data and providing a list of prescriptions from size perspective, an architectural modularity improvement analyzer for examining modularity problem diagnosis data and providing a list of prescriptions from architectural perspective, a functional concept modularity improvement analyzer for examining modularity problem diagnosis data and providing a list of prescriptions from functional concept perspective, a rule engine for storing and executing rules, and an improvement rule base for defining rules in a specific format for each modularity operator.

In an embodiment of the present invention, the optimal improvement suggestion selector module comprises an improvement suggestion selector module for receiving a prescription list from improvement analyzer module, a refactoring history repository for archiving prescription recommended for previous source code along with defects and gain suggested for various modules, and a conflict resolution heuristics for assessing prescriptions and its effect on modularity.

In an embodiment of the present invention, the refactoring engine comprises a refactoring operator repository for storing refactoring operators employed to improve source code modularity, a refactoring history repository for recording all refactoring applied to the source code, a code refactor for interpreting prescription in terms of refactoring operators from the refactoring history repository and applying them on the source code model. The refactoring engine retrieves a set of refactoring operators from source code model database and implements the changes to the source code as suggested by the optimal improvement suggestion selector module. The refactoring engine does not alter the external behavior of the code but improves its internal structure.

A method for providing suggestions for improving modularity of a software system is also provided. The method comprises the steps of receiving a source code, parsing the source code for creating a model of the source code, performing modularity analysis using source code model and architectural description document of source code, identifying structural, architectural, conceptual, and size based modularity defects in source code, generating set of prescriptive suggestions for each defect, evaluating effect of each prescriptive suggestion on overall software modularity, and finally selecting and presenting optimal suggestions to user via user interface. The method further comprises the step of generating architectural, size, conceptual, and structural prescriptions for removing architectural, size, conceptual, and structural defects from a software system.

In an embodiment of the present invention, the step of generating architectural prescriptions for removing architectural defect comprises the step of selecting an architectural defect from a source code file, determining whether the architectural defect is a back call defect, applying break cycle strategy if the architectural defect is not a back call defect, determining whether the called function belongs to a called module if the architectural defect is a back call defect, applying break dependency strategy if the called function does not belong to called module, applying split module strategy if the called function belongs to called module, and finally generating and filtering all prescriptions for back call defect.

In an embodiment of the present invention, the step of generating size and conceptual prescription for removing size and conceptual defects comprises the step of selecting a conceptually non-cohesive module, determining whether the non-cohesive module has dominant concepts, determining whether the non-cohesive module is a utility module if the non cohesive module does not have dominant concepts, reporting to the user if the non cohesive module is not a utility module, determining whether the non-cohesive module has size defect if the non-cohesive module has dominant concepts, applying split module strategy if the non cohesive module has size defect, determining whether the non cohesive module has conceptually divergent methods if the non-cohesive module does not have size defect, selecting conceptually non-cohesive method if the module has conceptually divergent concepts, applying strategy to move method, and finally generating and filtering size and conceptual prescriptions.

In an embodiment of the present invention, the step of generating structural prescriptions for removing structural defects comprises the steps of selecting a structural defect from a source code file, determining whether the structural defect is non API method call defect, processing direct state access if the structural defect is non API method call defect, determining whether the called function belongs to called module if the structural defect is an API method call defect, applying break dependency strategy if called function does not belong to called module and applying make API strategy if the called function belongs to called module.

In an embodiment of the present invention, the step of identifying critical dependency for breaking the module dependency cycle comprises the step of collecting functional call edge and direct state access edge for each module, computing critical dependency magnitude for each module dependency edge, iterating over critical dependencies in order of descending CDM values, selecting the module with the highest critical dependency value, iterating over functional call dependencies of module with highest critical dependency, calling the break function call dependency strategy, iterating over direct access dependencies of module with highest critical dependency module, and finally calling the break direct access strategy.

In an embodiment of the present invention, the step of performing module splitting comprises the steps of selecting a module from a source code file, determining whether the module has dominant concepts, performing conceptual module splitting if the module has multiple dominant concepts, performing structural module splitting if the module does not have multiple dominant concepts.

In an embodiment of the present invention, the step of performing conceptual module splitting comprises the steps of emptying a selected element list, selecting modules belonging to multiple dominant concepts, adding elements of the module belonging to multiple dominant concepts to selected element list, computing the total size of the selected element list, determining if the total size of the selected element list is between lower and upper size of threshold, and finally creating an empty module if the total size of the selected element list is between lower and upper size of threshold and moving the selected elements to empty module.

In an embodiment of the present invention, the step of evaluating prescriptions further comprises the step of evaluating the effect of each prescription on structural, architectural, conceptual, and size modularity.

BRIEF DESCRIPTION OF THE DRAWINGS

The present invention is described by way of embodiments illustrated in the accompanying drawings wherein.

DETAILED DESCRIPTION

A system and method for assessing a large legacy software system and providing prescriptive suggestions for improving modularity of the software system are described herein. The invention provides a set of prescriptions and evaluates its effect on modularity without actually implementing the changes in the software system. The invention also provides for evaluating the effect of each of the prescriptions recommended and suggesting the best amongst them. The method of the invention may be provided on a computer readable medium.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
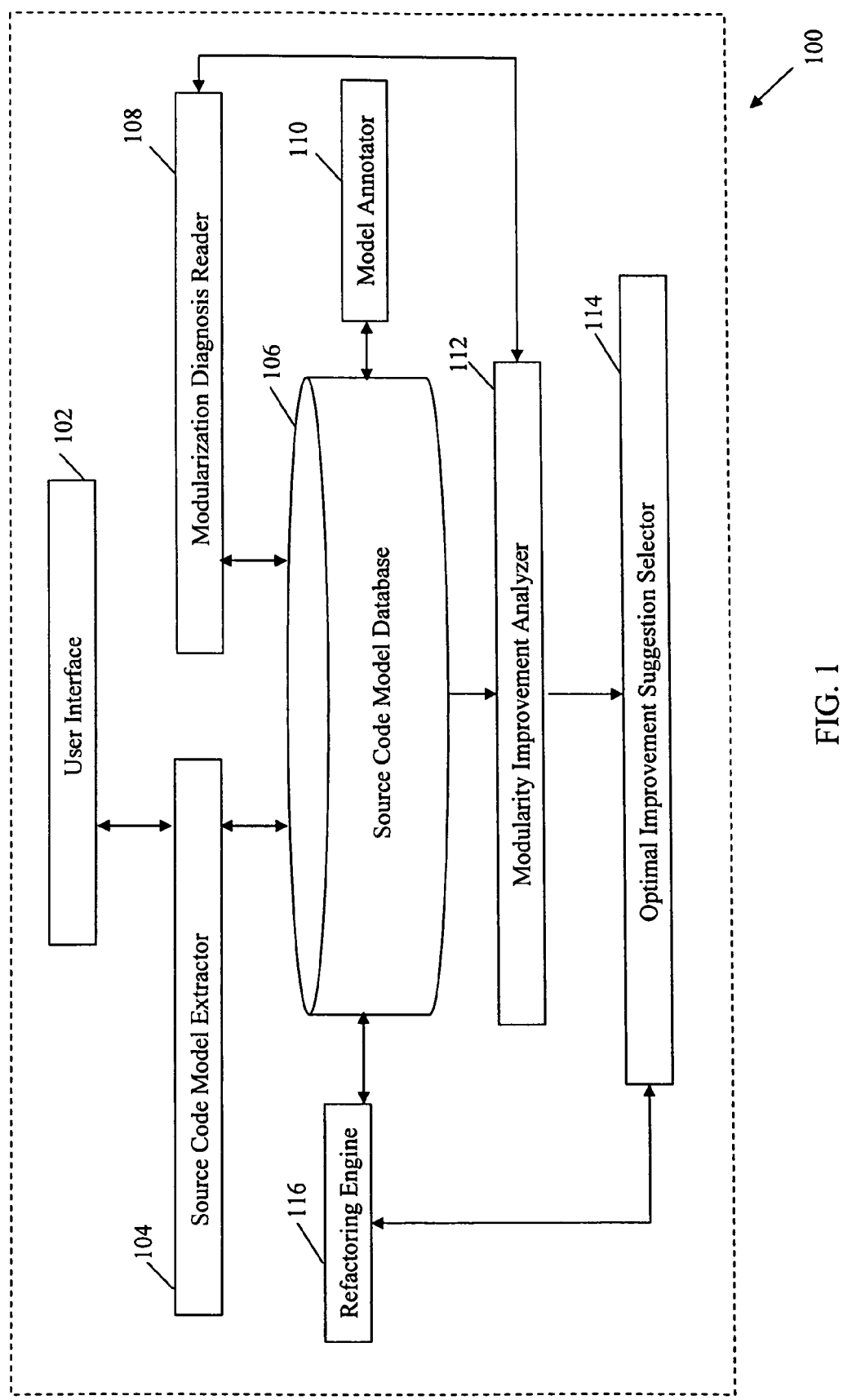
FIG. 1 illustrates a block diagram of an application modularity improvement suggestion system (AMISS) of the present invention.

FIG. 1 illustrates a block diagram of an application modularity improvement suggestion system (AMISS). AMISS 100 comprises a user interface module 102, a source code model extractor module 104, a source code model database 106, a modularization diagnosis reader module 108, a model annotator module 110, a modularity improvement analyzer module 112, an optimal improvement suggestion selector module 114, and a refactoring engine module 116.

The user interface module 102 acts as an interface between a user and the source code model extractor module 104. The user interface module 102 receives an input from the user and transfers it to the source code model extractor module 104 for processing. In an embodiment of the present invention, the input received by the user interface module 102 is a source code file of a software system/application. Source code file may include any computer programming file that is human readable and can be converted to machine readable form. The type of source code file used is not a limitation on the embodiments described herein. For example, and without limitation, the source code can be written in one or more programming languages such as COBOL, C, C++, VC++, .NET, and Java.

The source code model extractor module 104 parses the source code and extracts various details of the source code to form a model of the source code. In an embodiment of the present invention, the model formed from the source code comprise file information such as name and size, function information, function dependency information, global variable information, data structure information, dependency between global variables and functions, data structures and functions, and other programming constructs.

The source code model database 106 stores the abovementioned extracted source code model in a set of tables. In an embodiment of the present invention, source code model database 106 stores a set of refactoring operators and a record of all refactoring changes made to a source code. In various embodiments of the present invention, refactoring changes improves the internal structure of a software system but does not alter the external behavior of code. While refactoring changes create new versions that implement or propose change to software system, existing codes are not changed because of new requirements. In another embodiment of the present invention primitive refactoring operator such as 'declare method' and 'move' is used to improve the modularity of a software system. The 'declare method' refactoring operator declares a new method to overcome modularity defects. The 'move' refactoring operator moves an entity such as class, function or variable and alters all references to the entity such that the behavior is preserved. In yet another embodiment of the present invention, the refactoring operators are implemented in integrated development environment's (IDE's) such as eclipse java IDE and jetbrains IDE.

In yet another embodiment of the present invention, the source code model database 106 stores a set of improvement rules. In various embodiments of the present invention, the source code model database 106 may allow reading of various files and tables to create reports consisting of various recommendations to improve modularity of a software source code.

In an embodiment of the present invention, the database employed to store tables may be a SQL Server, however, various databases such as Oracle, MS Access, and FoxPro may also be used to implement source code model database 106.

The modularization diagnosis reader module 108 evaluates the modularity of a software system under consideration. The modularization diagnosis reader module 108 applies the extracted source code model and architectural description document of the source code for evaluating modularity of the source code. In an embodiment of the present invention, multiple metrics are used to measure the modularity of a given software system from various perspectives such as structure, size, concept, and architecture. In another embodiment of the present invention, the range of values generally lies between 'zero' and 'one' where 'zero' represents bad modularity and 'one' represents good modularity. In yet another embodiment of the present invention, a modularity diagnosis report is generated on the basis of metric values. The modularity diagnosis report at a higher level identifies specific function and function calls that violate modularity.

In an embodiment of the present invention, the architectural description document of the source code stores critical information on source code and comprise various sections including description of module using module tags, description of layers using layer tags, and a set of architectural constraints that a software system should follow. Once the modularity of the software is analyzed, the modularization diagnosis reader 106 creates a set of modularity problem diagnosis data. In an embodiment of the present invention, the modularity problem diagnosis data is represented in the form of classes. For example, classes such as StructureDiag, Information Diag, and ArchitectureDiag hold diagnosis information for structural, informational and architectural modularity problems respectively. The class StructureDiag for instance holds information on all bad functions with respect to MII metric.

The model annotator module 110 is employed to read and update source code model database 106 and provide graphs to reflect modularity defects. In various embodiments of the present invention, nodes and edges of the graphs are colored to provide instant identification of defects. The nodes in the code model graph are of various types such as function, file, data structure, and module. Similarly, edges in the code model graph include function calls, data structure access, file includes, and module membership. All nodes and edges have attributes representing defects. In another embodiment of the present invention, if a node or edge is involved in multiple defects, the strength of each defect is captured along with defect identification. For example, a function node may be simultaneously involved in a back-call defect, module dependency cycle defect, non-API method call defect and non-cohesive module defect. Similarly, a function node may be involved in two non-API method call defect. Depending upon the number and severity of modularity defects, defect strength which controls the color is defined and accordingly nodes and edges are colored with different strengths. An exemplary defect coloring scheme is as follows:

```
Iterate over each of the defects
    Get the nodes and edges participating in the defect
        If node/edge is already colored with defect type{
            Increase defect strength}
        Else
            {color the node/edge}
```

In addition to defect coloring, model annotator module 116 also annotates modules with specific information. The annotations which are captured are generally module structural type annotations, module functional type annotations, and module conceptual type annotations. Module structural type annotations are set of annotations that capture the structural properties of a module, module functional type annotations are set of annotations that captures the functional intent of a module, and module conceptual type annotations are set of annotations that capture the concepts implemented in a module. In an embodiment of the present invention, during implementation each of the abovementioned annotations are represented as attributes on the nodes of each module.

Module structural type annotations are further classified as utility module, driver module and intermediate module. In an embodiment of the present invention, utility module is a module whose ratio of fan-in to fan-out is greater than $\alpha$ where $\alpha$ is equal to 0.9. In another embodiment of the present invention, driver module is a module whose ratio of fan-in to fan-out is less than $\mu$ where $\mu$ is equal to 0.1. In yet another embodiment of the present invention, an intermediate module is defined as a module whose ratio of fan-in to fan-out is greater than $\mu$ but less than $\alpha$.

Further, three more criteria for classifying modules on the basis of module structural type include structural criteria, conceptual criteria and user defined patterns. Structural criteria define the criteria based on the module dependency structure for annotating a module with a particular structural annotation. Conceptual criteria defines the criteria based on the conceptual closeness of entities in the module for annotating a module with a particular structural annotation. User defined patterns define the criteria based on user heuristics for annotating a module with a particular structural annotation.

Structurally, utility modules have large fan-in (number of inputs) and very low fan-out (number of outputs) and vice-versa is applicable for driver modules. Conceptually utility modules are not coherent and are usually catch all (entirely non coherent) modules as they do not have one domain concept implemented in the modules. In an embodiment of the present invention, a module is coherent if entities in the module implement only one or very few concepts. This is quantified using the concept coherency metric (CCM). In various embodiments of the present invention, modules whose CCM value is zero are non coherent module whereas modules whose CCM value are one or close to one are coherent modules. Utility modules are generally defined as user defined patterns when they deal with security and user validation.

In module functional type annotation, modules are classified as graphical user interface (GUI) module, persistence handling module, and business logic module. In various embodiments of the present invention, persistence handling module is responsible for interacting with databases for storing and retrieving data whereas infrastructural modules don't contribute to the functionality of the system directly. In an exemplary embodiment, logging activities in a module are part of the infrastructure module. In another embodiment of the present invention, functional type annotation is a semi-automated process in which a functional type of a module is identified and annotated. Structurally, GUI modules generally have large fan-out and very low fan-in and vice versa is applicable for persistence handling module. Conceptually, domain concepts implemented in modules indicate functionality of the module. For example, 'menu', 'button', 'drop-down' etc. keywords in a module indicate that the module is a GUI module.

In module conceptual type annotation, module is annotated with domain concepts implemented in a module. For example, 'loan', 'deposit', 'cheque' etc. keywords in a module indicate that a module is implementing a loan concept and is annotated with the concept "loan". In an embodiment of the present invention, conceptual type annotation is a semi-automated process in which a functional type of a module is identified and annotated. In various embodiments of the present invention, a topic extraction method is used to derive domain concepts from source code and identify mixture of domain concepts in each module.

The modularity improvement analyzer module 112 reader reads the source code model and modularity problem diagnosis data from the modularization diagnosis reader module 108 and generates a set of prescriptions capable of improving the modularity of the system. In various embodiments of the present invention, the modularity improvement analyzer module 112 examines the modularity problem diagnosis data and provides a list of improvement operations from structural, size, architectural and functional perspective.

The optimal improvement suggestion selector module 114 evaluates a list of prescriptions generated by modularity improvement analyzer module 112. The prescriptions which are not able to pass the selection criteria are discarded. In an embodiment of the present invention, only those prescriptions are selected which may improve the overall modularity of the system. In another embodiment, if there are multiple prescriptions then a user intervention is required to decide on a specific prescription.

The refactoring engine 116 receives prescriptions from optimal improvement suggestion selector module 114 and applies them on the source code. In various embodiments of the present invention, refactoring engine retrieves a set of refactoring operators from source code model database 106 and implements the changes to the source code in light of the prescription suggested by the optimal improvement suggestion selector module 114. In various embodiments of the present invention, the function of refactoring engine is to change a software system in such a way that it does not alter the external behavior of the code but improves its internal structure.

Figure 2:
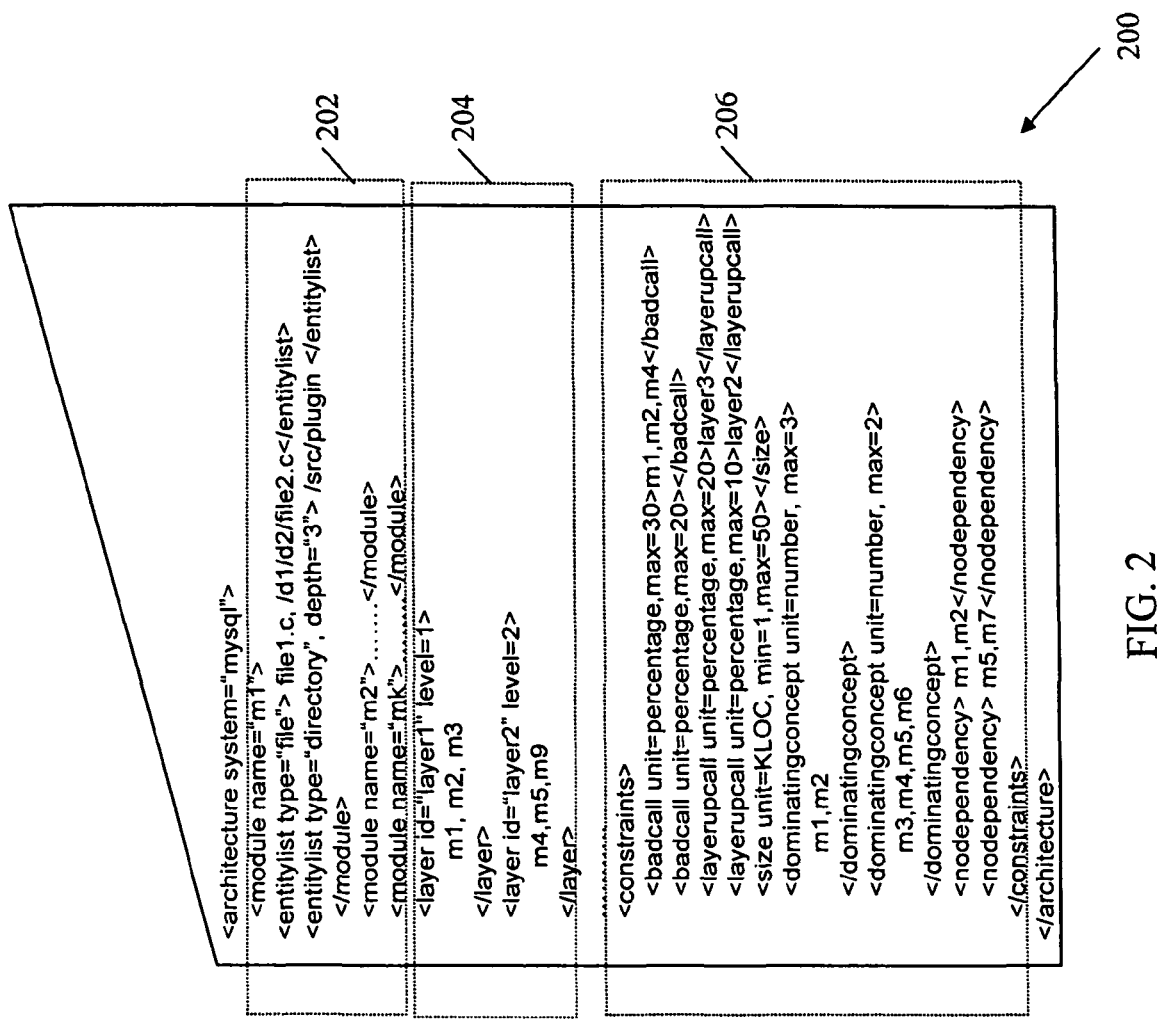
FIG. 2 depicts an exemplary architecture description document of the present invention.

FIG. 2 depicts an exemplary architecture description document of the present invention. The architecture description document 200 comprises a module section 202, a layer section 204, and an architectural constraint section 206. The module section 202 describes how the source code is partitioned into various modules and what portion of code has been written in each module. For example, one module tag (<module></module>) may specify a set of functions and data structures in a source code file and another module tag may specify a list of files within a directory.

The layer section 204 describes a set of modules that belong to a particular layer. In an embodiment of the present invention, a layer tag (<layer></layer>) may specify a list of modules that are there in a specific layer.

Architectural constraints section 206 represented by constraint tag (<constraint></constraint>) includes a set of design rules that an expert may provide who is maintaining a software system. Some of the design rules are primarily a set of design violations that may be allowed. For example, an architect may suggest that out of all the function calls made to a module m1, a maximum of 30% bad calls can be endured. A bad function call to m1 means that one more module is making a call to a function belonging to m1 which is not an API function.

In another example, an architect may define the percentage of inter-module calls that are allowed from a layer to another layer above it. The architect may specify a level to which such a call can be tolerated for a given system using a layer up call (<layerupcall></layerupcall>) tag.

In yet another example, the architect may define the minimum and maximum size of a module using the size (<size></size>) tag. Similarly, the architect may specify a maximum number of dominating concepts that are allowed in a given module using a dominating concept (<dominating concept></dominating concept>) tag. In various embodiments of the present invention, modules with only one dominating concept are recommended. In another example, the architect may specify that a module m1 and a module m2 should not have any dependency which may be represented by a nodependency tag (<nodependency> </nodependency>).

Figure 3:
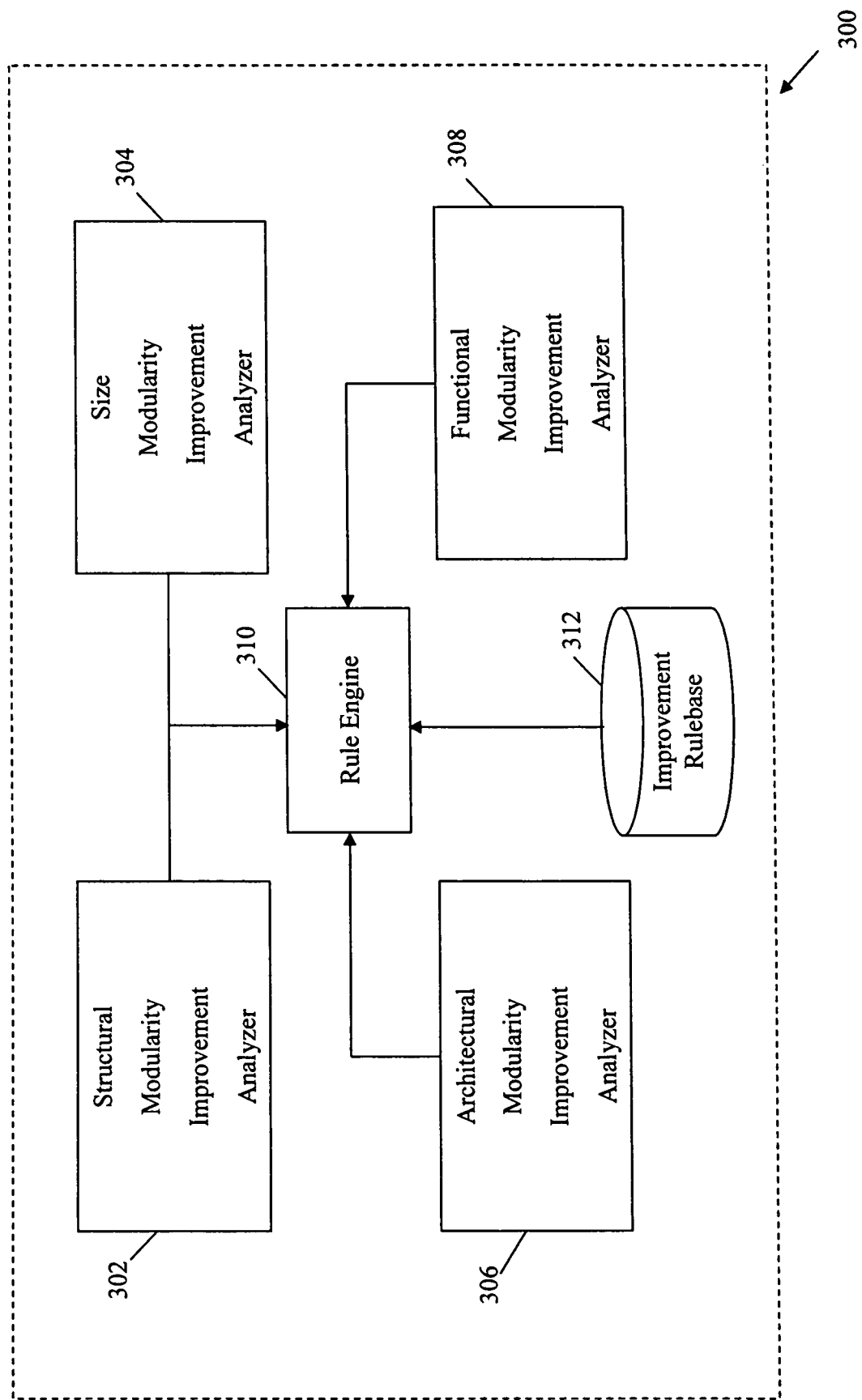
FIG. 3 illustrates a detailed block diagram of modularity improvement analyzer module of the present invention.

FIG. 3 depicts a detailed block diagram of modularity improvement analyzer module of the present invention. The modularity improvement analyzer module 300 comprises a structural modularity improvement analyzer 302, a size modularity improvement analyzer 304, an architectural modularity improvement analyzer 306, a functional concept modularity improvement analyzer 308, a rule engine 310 and an improvement rule base 312.

The structural modularity improvement analyzer 302 examines the modularity problem diagnosis data and provides a list of prescription from structural perspective. For example, the structural modularity improvement analyzer may suggest the following prescription on the source code:
  Re-route a call to a function in a module through a published API function of a module
  Move a function from one module to another
  Create a new API function
  Designate a function in a module The size modularity improvement analyzer 304 examines the modularity problem diagnosis data and provides a list of prescriptions from size perspective. For example, the size modularity improvement analyzer 304 may suggest the following prescriptions on source code:
  Split a module with large size into two smaller sized modules
  Merge two smaller modules into a bigger module The architectural modularity improvement analyzer 306 examines the modularity problem diagnosis data and provides a list of prescriptions from architectural perspective. The defects which are addressed by architectural prescriptions are of two types i.e. back call defect and module dependency cycle defect. Based on these defects either break cycle strategy or split module strategy is employed. A back call defect is based on the layering principle. For example, if the destination of the function call is in a layer that is above the layer of the calling function, then a back call defect exists in a software system.

In break cycle strategy, the occurrence of module dependency cycle is detected i.e. if each module is reachable from all the other modules then there exists a module dependency cycle. Once the occurrence of module dependency cycle is detected then the algorithm for breaking the cycle is employed which primarily involves two major steps i.e. identifying critical dependencies and breaking the critical dependencies.

For example, the architectural modularity improvement analyzer may suggest the following prescriptions on source code:
  Identify cyclic dependencies among modules and suggest how to break the cycle
  Identify inter-module up-calls (call from a module m to another module $m_1$ residing in another layer which is above the layer where the module m resides)

The functional concept modularity improvement analyzer 308 examines the modularity problem diagnosis data and provides a list of improvement operations from functional concept modularity perspective. In a well modularized system all modules are functionally cohesive. However, in poorly modularized systems there exist many non cohesive modules. For example, in a banking system the possibility of having a loan module is high. As a result, if all the files in a loan module are functionally related to the loan concept, then the module is said to be functionally cohesive. However, if the loan module has files that deal with concepts other than loan such as, deposit or interest calculation, then it is said to be functionally non-cohesive. In various embodiments of the present invention, functional concept modularity improvement analyzer improves the modules that are not functionally cohesive.

For example, the functional modularity improvement analyzer may suggest the following prescriptions on source code:
  Identify the function which is not functionally cohesive with respect to the module where it currently belongs
  Identify the module where the function should fit the best.

The rule engine 310 comprises a DROOLS rule engine that is used to store and execute rules that are defined in the DROOL file having an extension .drl. In an embodiment of the present invention modularity improvement rules are defined as per the DROOL syntax. The improvement rule base 312 has rules defined in the DROOLS rule format for each modularity operator.

Figure 4:
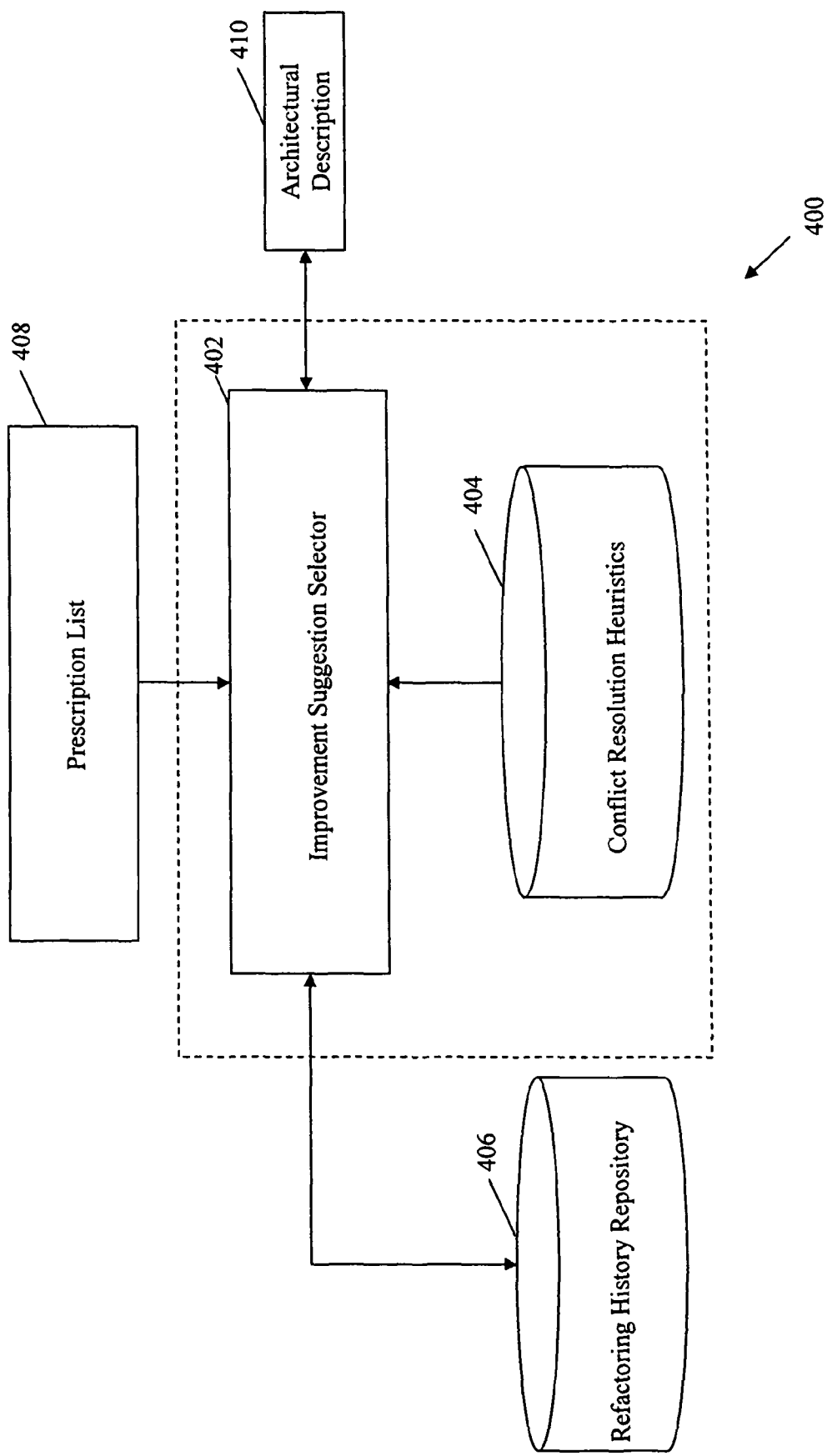
FIG. 4 illustrates a block diagram of an optimal improvement suggestion selector of the present invention.

FIG. 4 illustrates a block diagram of an optimal improvement suggestion selector. The optimal improvement suggestion selector 400 comprises an improvement suggestion selector 402, conflict resolution heuristics 404, refactoring history repository 406, prescription list 408, and architectural description document 410. The improvement suggestion selector 402 receives a prescription list 408 from improvement analyzer module 110 (FIG. 1). The refactoring history repository 406 archives the prescription recommended for previous source code along with the defect and gain suggested for various modules. In various embodiments of the present invention, if the number of defects exceeds the allowable threshold then the prescription with the highest gain that introduced a modularity defect of the same type in the past is selected. In an embodiment of the present invention, if the gain of the selected prescription from prescription history repository 406 is less than the gain of the current prescription, then the prescription from the repository is reverted and the current prescription is applied. The improvement suggestion selector 402 along with architectural description document 410, conflict resolution heuristics 404, and refactoring history repository 406 decides upon a specific prescription which can increase the modularity of a software system. In another embodiment of the present invention, conflict resolution heuristics is applied to assess prescriptions where one prescription deteriorates the structural perspective and improves the remaining perspectives. In yet another embodiment of the present invention, conflict resolution heuristics is applied in conditions where one prescription deteriorates the architectural perspective and improves all remaining perspectives. Conflict resolution heuristic helps in resolving cases where relative importance of one prescription with respect to another needs to be assessed while making a decision.

In an embodiment of the present invention, if the number of defects exceeds the allowable threshold then the prescription with the highest gain that introduced a modularity defect of the same type is used. In another embodiment, if the gain of the selected prescription is less than the gain of the current prescription then the current prescription is applied and the prescription from the repository is discarded.

The prescriptions are expressed in terms of modularity operators and represent a minor change (delta) in the source code model that may improve the modularity. The actual gain in modularity is quantified by measuring a delta change in the various metric values due to delta change in the source code model.

The delta change in each of the architectural, size, conceptual, and structural type of modularity metric is aggregated into a unified metric value using the weighing scheme provided by the user. In an embodiment of the present invention, a weighing scheme allocates relative importance to different metrics. For example, a scheme may represent a unified value as follows:

$$UnifiedValue=0.25*LOI+0.15*MSBI+0.25*CDM+0.35*MII.$$

In another embodiment of the present invention, equal importance is given to each of the metrics while using a weighing scheme. This information is provided by the user in an XML based configuration file.

In various embodiments of the present invention, modularity improvement is performed in a hierarchical fashion addressing initially the architectural defects, then the conceptual and size modularity defects and finally the structural defects. For each defect there may be more than one potential way of fixing the defect. However, the degree of modularity gain that can be achieved by applying these fixes/prescriptions would vary. Also even though there would be an absolute gain in modularity these prescriptions might improve modularity in some dimensions, but reduce in other.

In an embodiment of the present invention if the overall gain in modularity is not positive i.e. it improves in certain dimension but deteriorates in other and further introduces new defects then the acceptable number of modularity defects provided by the user is used to decide whether to select prescriptions or discard it.

Figure 5:
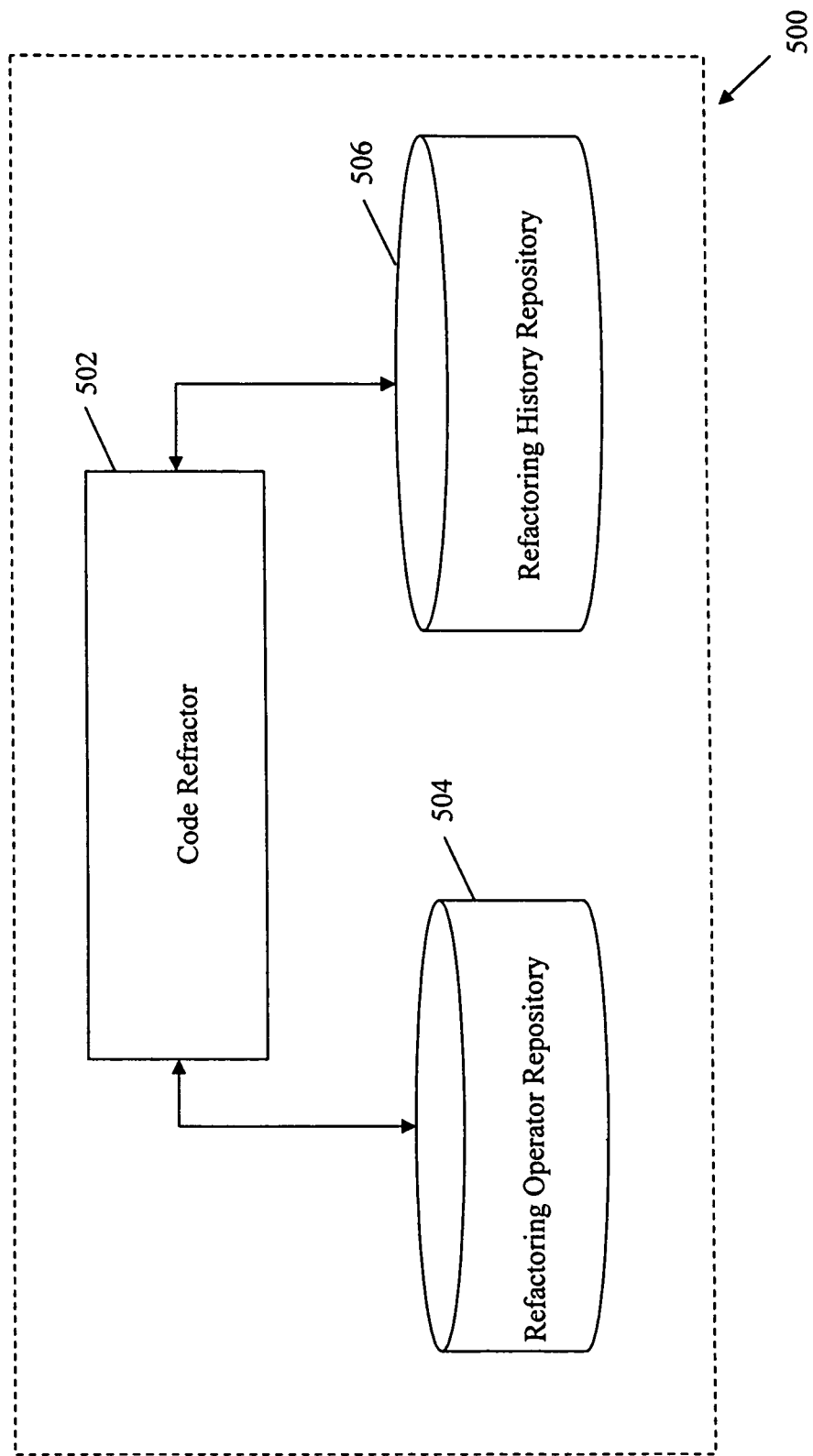
FIG. 5 illustrates a block diagram of a refactoring engine.

FIG. 5 illustrates a block diagram of refactoring engine. The refactoring engine 500 comprises a code refractor 502, refactoring operator repository 504, and refactoring history repository 506. Refactoring engine 500 is responsible for receiving the prescriptions as input and performing the corresponding changes accordingly. Code refactor 502 is a constituent part of the refactoring engine 500 and interprets the prescription in terms of the refactoring operators from the refactoring history repository and applies them on the source code model. In an embodiment of the present invention, the code refactor changes the model of the code in the source code model database. In various embodiments of the present invention changes may be applied to the source code directly. For example, JunGL may be used to apply refactoring directly to the source code. Refactoring history repository 506 records a history of all the refactorings applied to the source code. In another embodiment of the present invention, refactorings history may retrieve and revert all changes, if required, by the modularity improvement system to increase modularity.

Figure 6:
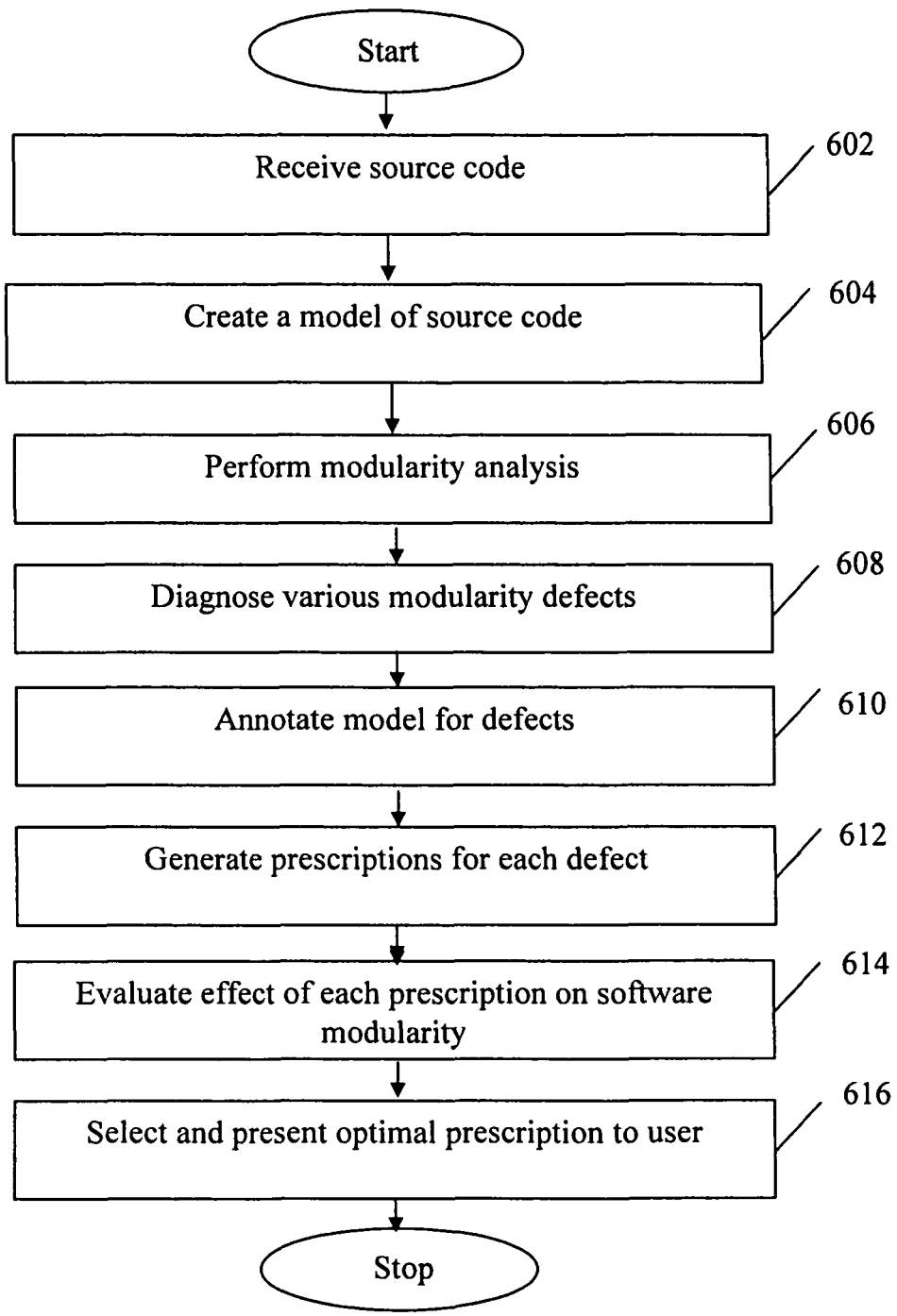
FIG. 6 illustrates a method of improving modularity of a software system.

FIG. 6 illustrates a method of improving modularity of a software system. At step 602 source code is received from a software system or application. At step 604 source code is parsed to create a model of the source code. In an embodiment of the present invention, the model formed from the source code include file information, function information, function dependency information, global variable information, data structure information, dependency between global variables and functions, data structures and functions, and other programming constructs.

At step 606 modularity analysis is performed using source code model and architectural description document of the source code. In various embodiments of the present invention, source code model is used to form a graph to calculate modularity metrics. In an embodiment of the present invention, source code entities such as file, function, module, layer, data type, and variables form nodes and relation between source code entities such as method call, variable reference etc. form edges to complete the graph.

At step 608 various modularity defects are diagnosed based on modularity metric values. In an embodiment of the present invention, the defects which are diagnosed comprise back call, module dependency cycle, non-API method call, direct global variable access, non-cohesive module, and very large module.

At step 610 modules are annotated for defects. In an embodiment of the present invention, nodes and edges of the graph are colored to reflect modularity defect. In another embodiment, modules are annotated with specific information about the module such as structural type annotation, functional type annotation, and conceptual type annotation.

At step 612 a set of prescriptive suggestions for each of the defect is generated. In an embodiment of the present invention, prescriptions are presented in a hierarchical fashion presenting first the architectural defects, then the conceptual and size defects, and lastly the structural defects.

At step 614 effect of each prescription on software modularity is evaluated. In an embodiment of the present invention, the prescriptions which are not able to pass the selection criteria are discarded. In another embodiment of the present invention, each prescription is evaluated for the effect it renders to structural, architectural, conceptual, and size modularity. In various embodiments of the present invention, only those prescriptions are selected which may improve the overall modularity of the system. In yet another embodiment of the present invention, if there are multiple prescriptions then a user intervention is required to select an appropriate prescription. At step 616 optimal prescriptions are selected for improving modularity and are presented to the user via user interface.

Figure 7:
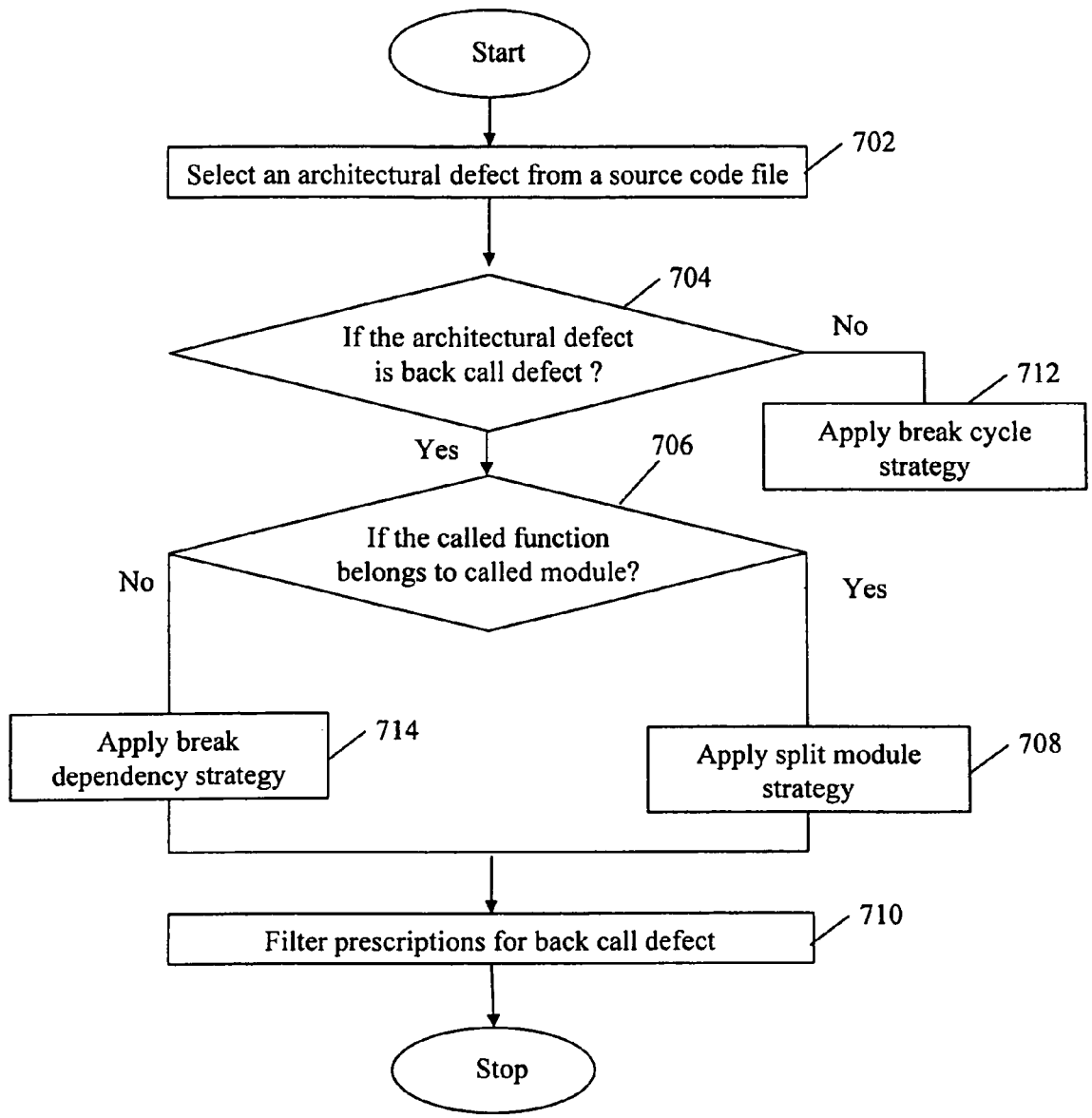
FIG. 7 illustrates a method of generating architectural prescriptions for removing architectural defects from a software system.

FIG. 7 illustrates a method of generating architectural prescriptions for removing architectural defects from a software system. At step 702 an architectural defect from a source code file is selected. At step 704 a check is performed to ensure whether the architectural defect is a back call defect. If the architectural defect is not a back call defect then at step 712, break cycle strategy is applied. If the architectural defect is a back call defect, then at step 706 a check is performed whether the called function belongs to a called module. If the called function does not belong to called module then at step 714, break dependency strategy is applied. If the called function belongs to called module then at step 708 split module strategy is applied. At step 710 all the prescriptions are filtered for back call defect.

Figure 8:
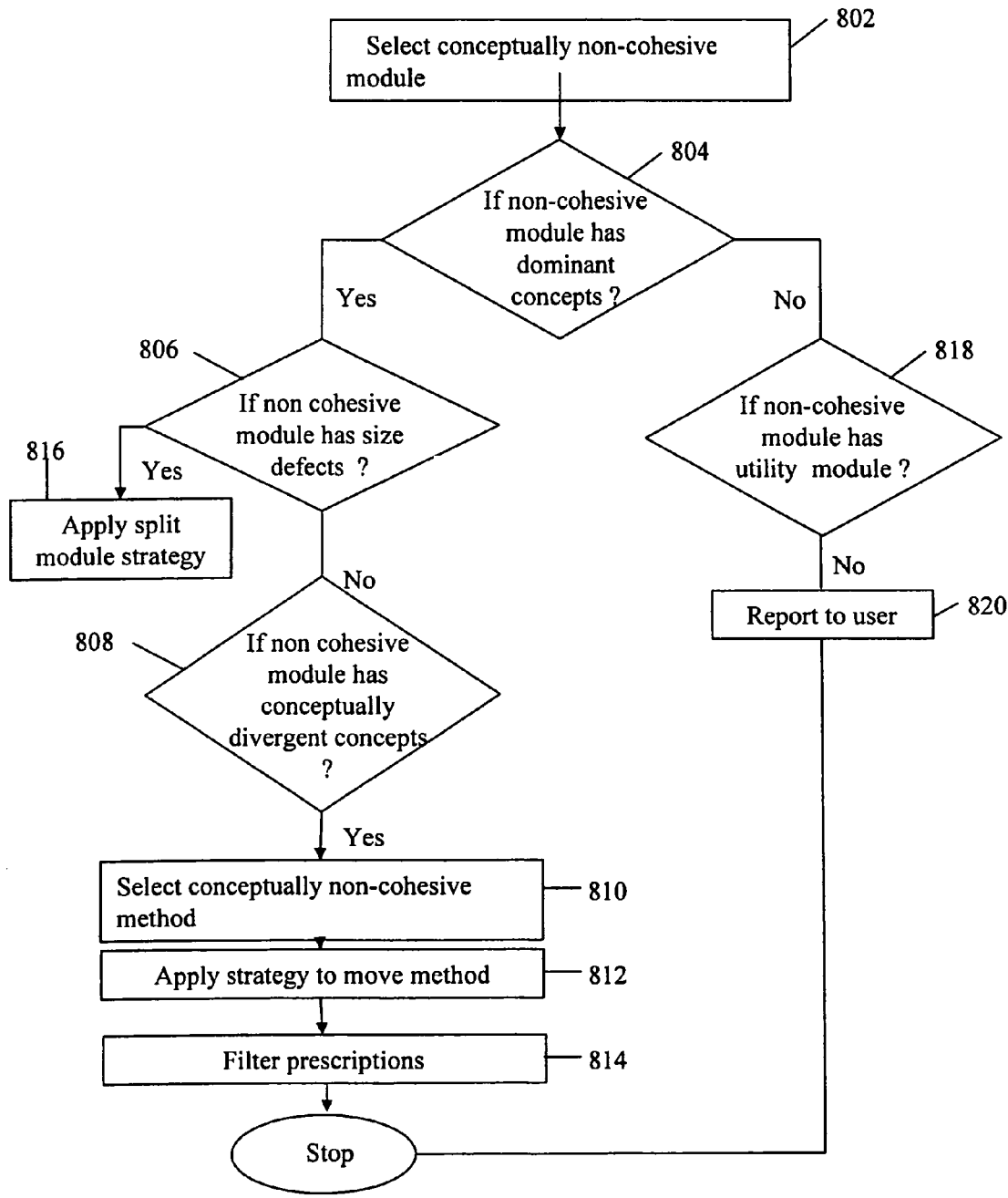
FIG. 8 illustrates a method of generating size and conceptual prescriptions for removing size and conceptual defects from a software system.

FIG. 8 illustrates a method of generating size and conceptual prescriptions. At step 802 conceptually non-cohesive module is selected. In an embodiment of the present invention, a module is conceptually cohesive if entities in the module implement one or few domain concepts. In another embodiment of the present invention, conceptually cohesive modules are generally quantified by using concept coherency metric (CCM) and concept domination metric (CDM) where high metric values denotes high coherency.

At step 804 a check is performed whether the non-cohesive module has dominant concepts. If the non-cohesive module does not have dominant concepts then at step 818, a check is performed whether the non-cohesive module is a utility module. If the non-cohesive module is not a utility module then at step 820, it is reported to the user. If the non-cohesive module is not a utility module then at step 820, it is reported to the user.

If the non-cohesive module has dominant concepts then at step 806, a check is performed whether the non-cohesive module has size defect. If the non cohesive module has size defect then at step 816, split module strategy is applied.

If the non cohesive module does not have size defect then at step 808, a check is performed whether the non-cohesive module has conceptually divergent methods. If the non cohesive module has conceptually divergent methods then at step 810, conceptually non-cohesive method is selected. At step 812, strategy to move method is applied on conceptually non cohesive method having conceptually divergent methods and dominant concepts. At step 814, size and conceptual prescriptions are generated and filtered. In an embodiment of the present invention, a method is said to be conceptually divergent if the concept implemented in the method is not from the set of dominant concepts in the containing module. In another embodiment of the present invention, the set of dominant concepts is identified using the CDM metric. In yet another embodiment of the present invention, 'move method' operation moves the divergent methods to a module whose set of dominant concepts matches the concepts implemented in the methods. The conceptual similarity of a method to a given module is calculated according to the abovementioned conceptual proximity formula.

Figure 9:
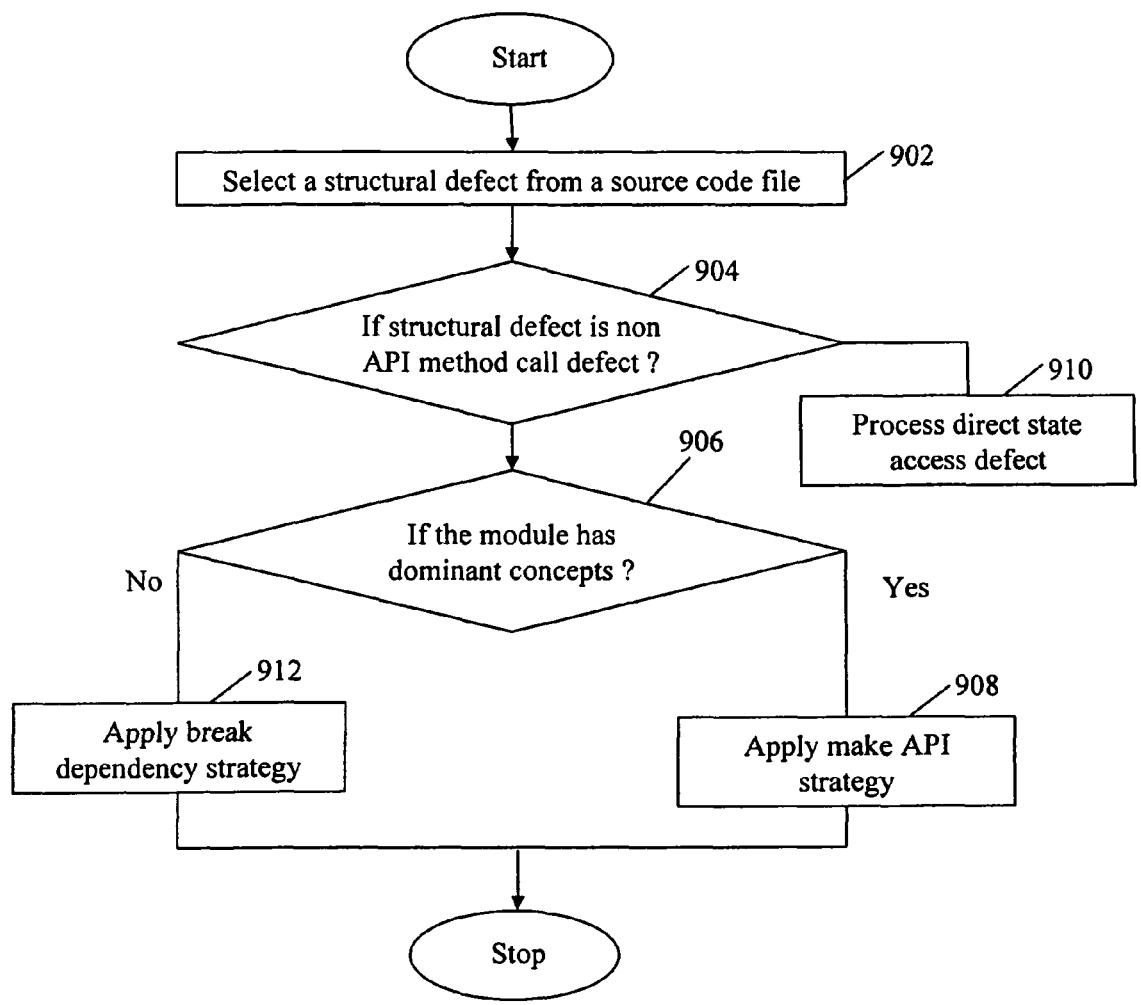
FIG. 9 illustrates a method of generating structural prescriptions for removing structural defects from a software system.

FIG. 9 illustrates a method of generating structural prescriptions. At step 902 a structural defect from a source code file is selected. At step 904 a check is performed whether the structural defect is 'non-API method call' defect. If the structural defect is not a 'non-API method call' defect then at step 910, processing of direct state access defect is performed. In an embodiment of the present invention, a direct state access defect is one in which variable is accessed from a function in a different module. If the structural defect is a 'non-API method call' defect then at step 906, a check is performed whether the called function belongs to called module. If the called function does not belong to called module then at step 910, break dependency strategy is applied. If the called function belongs to called module then at step 912, make API strategy is applied.

Figure 10:
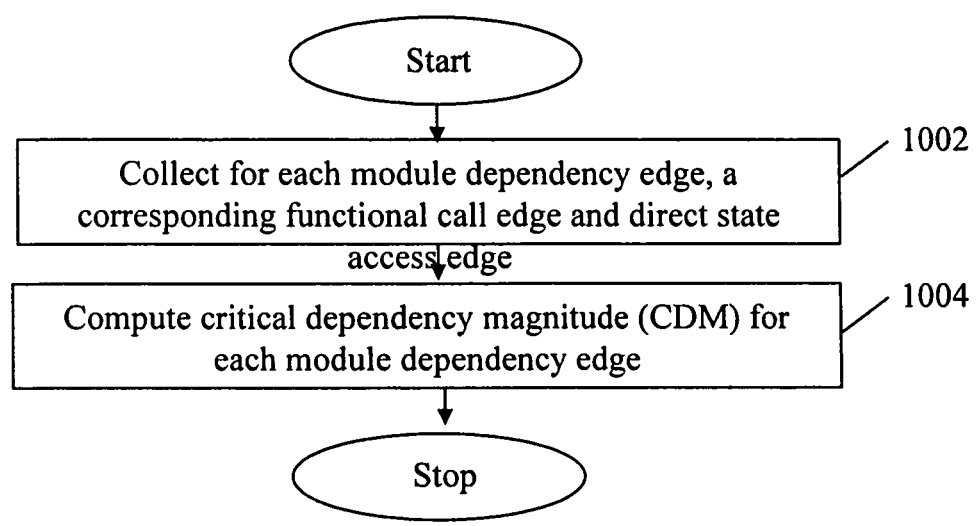
FIG. 10 illustrates a method of identifying critical dependencies for breaking the module dependency cycle.

FIG. 10 illustrates a method of identifying critical dependencies for breaking the module dependency cycle. At step 1002 for each module dependency edge a corresponding functional call edge and direct state access edge is collected. In an embodiment of the present invention, module dependency edge is an edge where both the source and destination nodes are of type module and the source module depends on the destination module. In another embodiment of the present invention, function call edge is an edge where both the source and destination nodes are of type function and the source calls the destination. In yet another embodiment of the present invention, direct state access edges are employed where the source node is of type function and the destination node is of type data structure. At step 1004 critical dependency magnitude (CDM) is computed for each of the module dependency edges as follows:

$$CDM(M_e) = \sum_{\forall e \in edges(M_e)} \sum_{\forall d \in defects(e)} magnitude(d)$$

Where Me is a function that returns the corresponding function call edge and direct state access edge for each module dependency edge, defects (e) is the function that returns the modularity defects caused by edge, and magnitude is the amount of defect (d).

Figure 11:
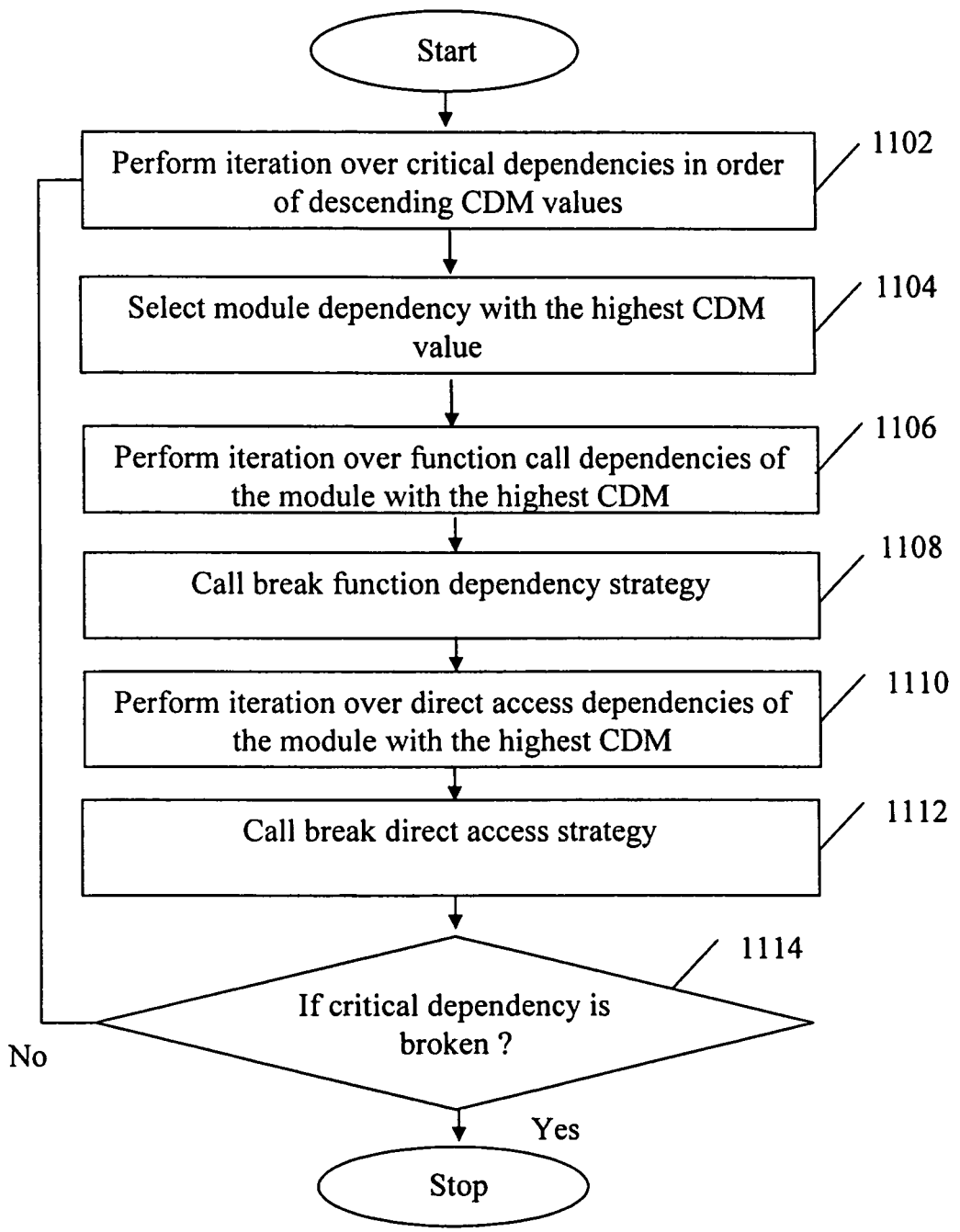
FIG. 11 illustrates a method of breaking critical dependencies.

FIG. 11 illustrates a method of breaking critical dependencies. At step 1102 iteration over critical dependencies in order of descending CDM values is performed. At step 1104 the module dependency with the highest CDM value is selected and is considered for processing. At step 1106 iteration over function call dependencies of the module with the highest CDM value is performed. At step 1108 break function call dependency strategy is called. At step 1110 iteration over direct access dependencies of the module with the highest CDM is performed. At step 1112 break direct access strategy is called.

In an embodiment of the present invention, direct state access defect involves variable of type data structure (d) in a module (m1) that has been accessed directly by a function (f) in a different module (m2). The sequence of steps used for break direct state access is as follows:
1. Check if 'd' belong to 'm1'?
2. If Yes: call 'Cover variable with getter/setter'
3. If No: call 'Move variable between modules'

At step 1114, a check is performed whether the critical dependency is broken. If the critical dependency is not broken then steps 1102 to 1112 are repeated.

In various embodiments of the present invention, basic refactoring operators such as cover function with façade, add function, cover variable with getter/setter, move function between files etc. are used for enhancing the modularity of a software system.

Examples of various refactoring operators along with conditions and actions are as follows:
Cover function with façade function
    Conditions:
        Function fu in file fi in module m
        fu is API
        Cext(fu) is the set of external calls to fu Actions:
    Add definition of function fu_facade in fi, with same signature as fu
    Add body {call to fu} to fu_facade
    Make fu_facade API
    For every call in Cext(fu), replace it by a call to fu_facade
    Make fu non-API
Add function
    Conditions:
        Fully qualified function name is unique.
    Action:
        Create a new function and add to the file.
Cover variable with getter/setter
    Conditions:
        Variable v in file fi in module m
        C(v) is the set of accesses of v
        Cext(v) is the set of external accesses of v
        v has no getter/setter
    Actions:
        Add definition of functions get_v and set_v in fi
        Add obvious bodies to get_v and set_v
        If Cext(v) is not empty, make get_v and set_v API functions
        For every read access in C(v), replace it by a call to get_v
        For every write access in C(v), replace it by a call to set_v
        Make v internal
Move function from file fi1 to file fi2
    Conditions:
        Function fu in file fi1
        File fi1 is in module m1, file fi2 is in module m2
        C1(fu) is the set of functions in m1 calling fu
        C2(fu) is the set of functions in m2 calling fu
        Cext(fu) is the set of functions outside m1 and m2 calling fu
        D1(fu) is the set of functions in m1 called by fu
        D2(fu) is the set of functions in m2 called by fu
        Dext(fu) is the set of functions outside of m1 and m2 called by fu
    Actions:
        In fi2:
            For every function fv in D1(fu), add import(header_api(file(fv)))
            For every function fv in D2(fu), add import(header(file(fv)))
            For every function fv in Dext(fu), add import(header_api(file(fv)))
            (if it does not already exist)
        Add function definition (and body) of fu in fi2
        Add declaration of fu in header(fi2)
        If functions outside of m2 call fu:
            Create header_api(fi2) if it does not exist
            Add declaration of fu in header_api(fi2)
        For every file containing a function fv in C1(fu):
            Add import(header_api(fi2)) if it does not exist
            Delete import(header(fi1)) if it is now unused
        For every file containing a function fv in C2(fu):
            Add import(header(fi2)) if it does not exist
            Delete import(header_api(fi1)) if it is now unused
        For every file containing a function fv in Cext(fu):
            Add import(header_api(fi2)) if it does not exist
            Delete import(header_api(fi1)) if it is now unused
        If functions outside of m1 call fu:
            Remove declaration of fu from header_api(fi1)
            Delete header_api(fi1) if it is empty
        Remove declaration of fu from header_api(fi1)
        Delete definition of fu in fi1
        In fi1:
            For every function fv in D1(fu), remove import(header(file(fv)))
            For every function fv in D2(fu), remove import(header_api(file(fv)))
            For every function fv in Dext(fu), remove import(header_api(file(fv)))
            (if it is no longer used)

In various embodiments of the present invention, various modularity operators such as make function API, make function non-API, move function between modules, move data structure between modules, create empty module, delete empty module etc. are also employed for improving the modularity of a software system. Examples of various modularity operators along with conditions and actions are as follows:

Make function API
    Conditions:
        Function fu in file fi
    Actions:
        Create file header_api(fi) if it does not exist
        Add declaration of f in header_api(fi)
Make function non-API
    Conditions:
        Function fu in file fi, declared in header_api(fi)
        No extra-module calls are made to fu
    Actions:
        Delete declaration of f in header_api(fi)
        Delete header_api(fi) if the file contains no declarations
Move function from module m1 to module m2
    Conditions:
        Function fu in file fi1 in module m1
        File fi2 in module m2 (will be created if m2 contains no files)
    Actions:
        Create fi2 if m2 contains no files
        Move function fu from fi1 to fi2
        If fi1 is empty:
            Delete header(fi1)
            Delete fi1
Move variable from module m1 to module m2
    Conditions:
        Variable v in file fi1 in module m1
        File fi2 in module m2 (will be created if m2 contains no files)
    Actions:
        Create fi2 if m2 contains no files
        Move variable v from fi1 to fi2
        If fi1 is empty:
            Delete header(fi1)
            Delete fi1
Create empty module
    Conditions: none.
    Action: create an empty module.
Delete empty module
    Conditions: none.
    Action: delete an empty module.

Figure 12:
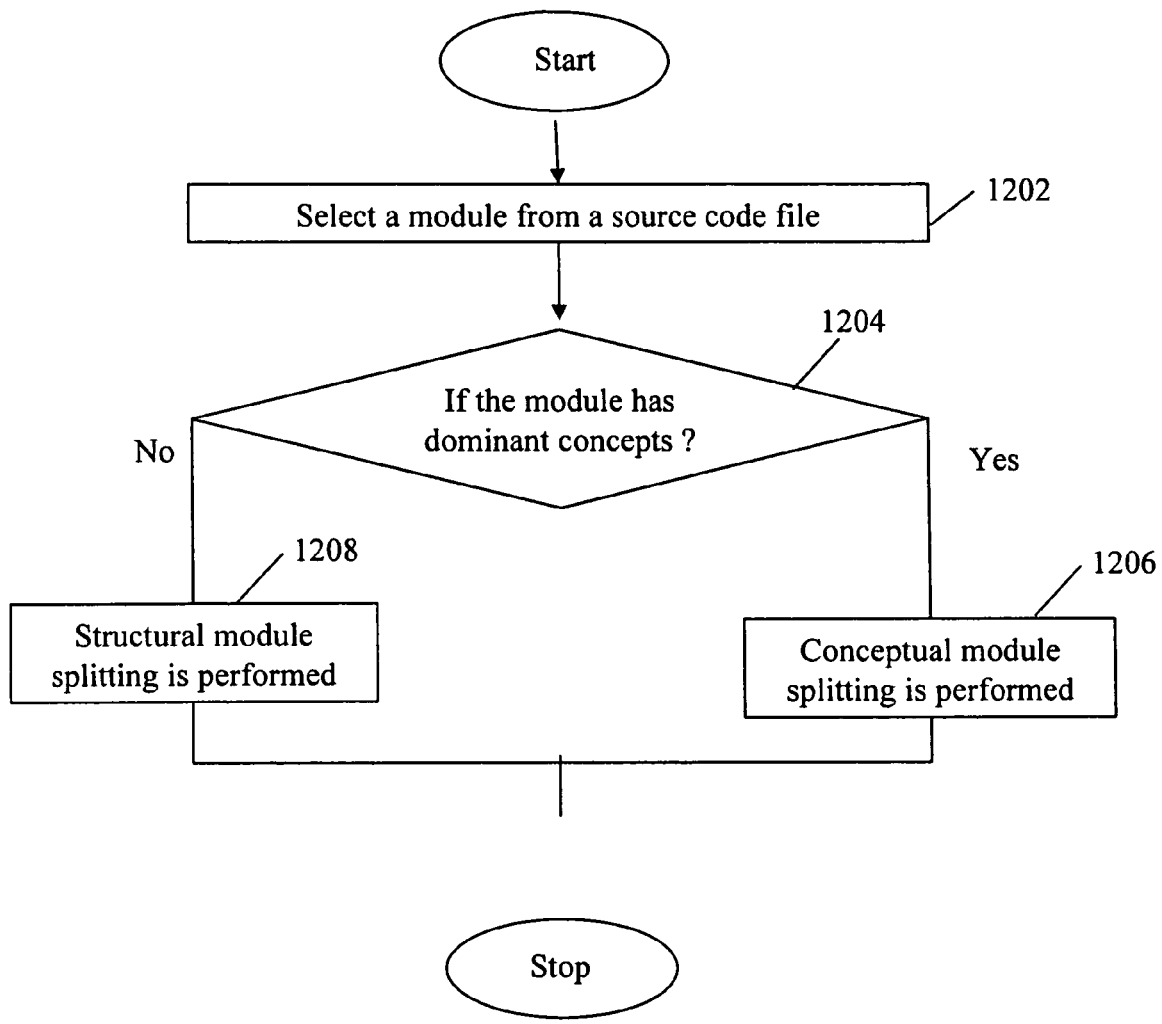
FIG. 12 illustrates a method of module-splitting employed as a prescription step for improving modularity in a software system.

FIG. 12 illustrates a method of module-splitting employed as a prescription step in an embodiment of the present invention. At step 1202, a module from a source code file is selected. At step 1204, a check is performed whether the module has multiple dominant concepts. If the module has multiple dominant concepts then at step 1206, conceptual module splitting is performed. If there are no multiple dominant concepts then at step 1208, structural module splitting is performed.

Figure 13:
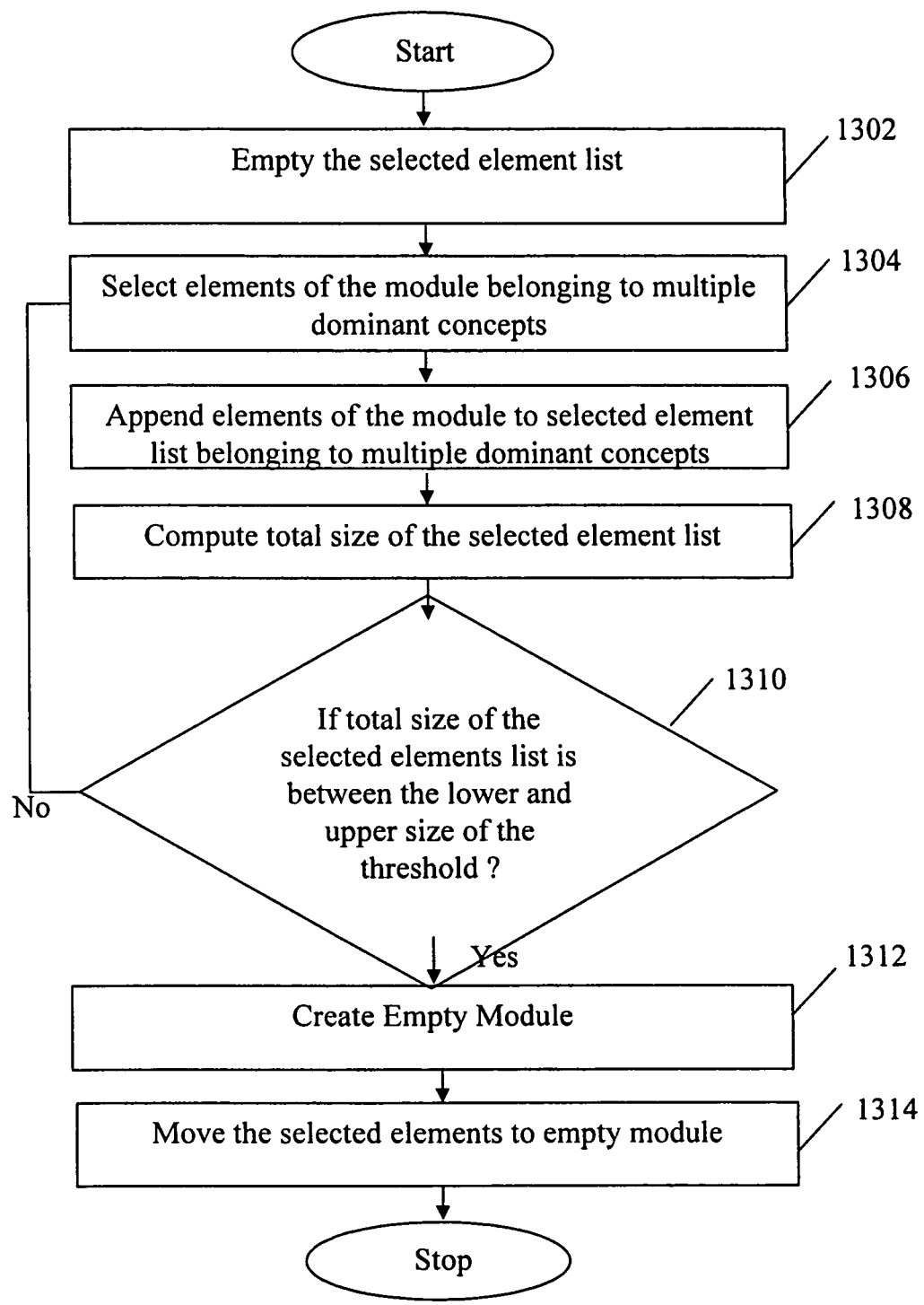
FIG. 13 illustrates a method of conceptual module splitting employed as a prescription step for improving modularity in a software system.

FIG. 13 illustrates a method of conceptual module splitting employed as a prescription step in an embodiment of the present invention. At step 1302 a selected element list is made empty. In an embodiment of the present invention, selected element list is a variable that holds the entities in the module that do not conceptually belong to a particular module. In another embodiment of the present invention, if the concepts implemented in the entity are not the concepts assigned to the module, they are simply added to the list. At step 1304, elements of the module belonging to multiple dominant concepts are selected. At step 1306, elements of the module belonging to multiple dominant concepts are added to the selected element list. At step 1308, total size of the selected element list is computed. At step 1310, a check is performed whether the total size of the selected element list is between the lower and upper size of the threshold. If the total size of the selected element list is between the lower and upper size of the threshold then at step 1312 an empty module is created. At step 1314, elements in the selected element list are moved to empty module. If the total size of the selected element list is not in between the lower and upper size of the threshold then steps 1304 to step 1310 are repeated.

Figure 14:
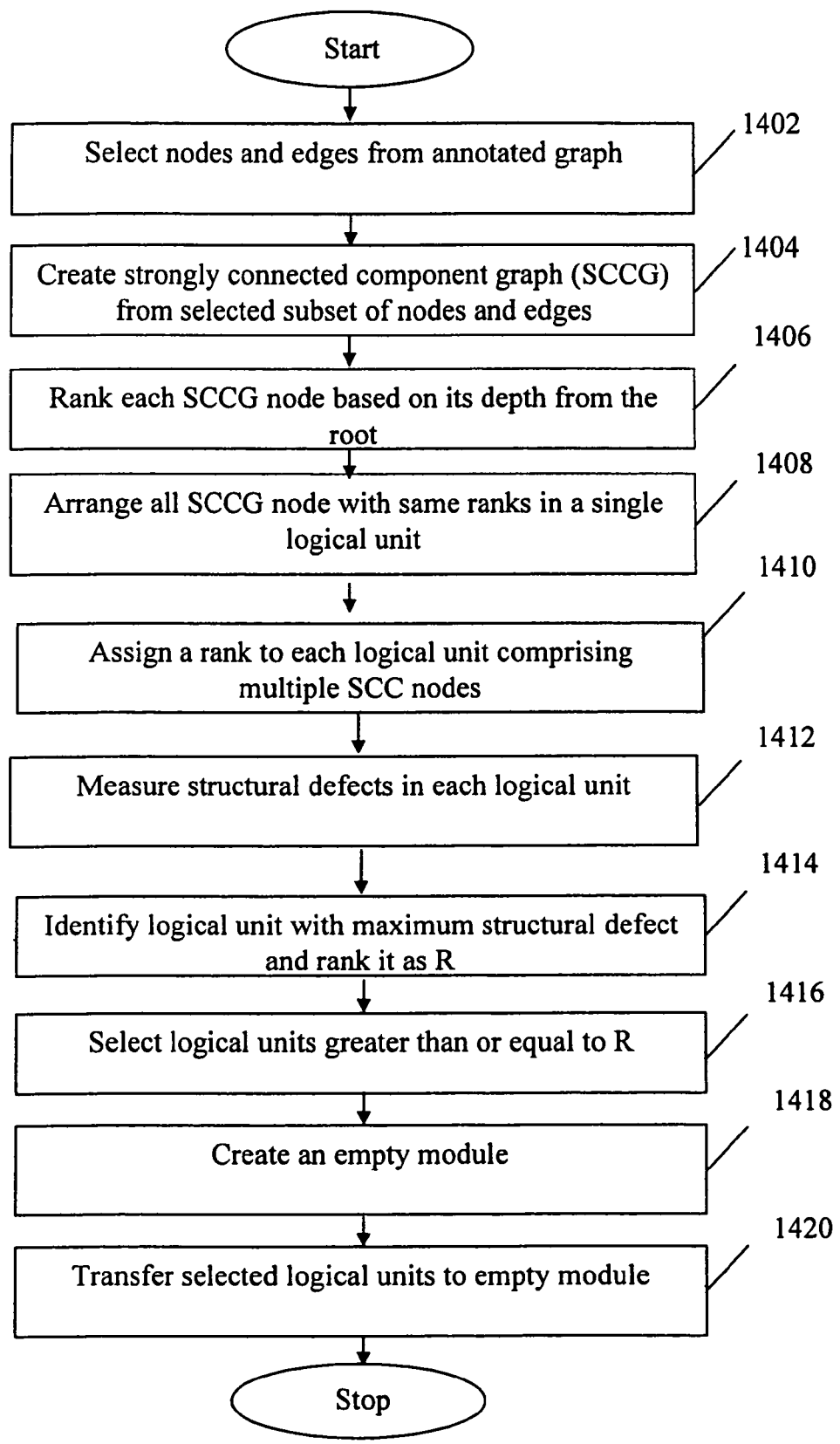
FIG. 14 illustrates a method of structural module splitting employed as a prescription step for improving modularity in a software system.

FIG. 14 illustrates a method of structural module splitting employed as a prescription step for improving modularity in a software system. At step 1402, subset of nodes and edges from annotated graph representing defect is selected where each node belongs to a module that requires splitting. In various embodiments of the present invention, each edge of the annotated graph connects selected nodes. At step 1404, a strongly connected component graph (SCCG) from the selected subset of nodes and edges is created. At step 1406, each SCCG node based on its depth from the root is ranked. At step 1408, all SCCG nodes with same ranks are arranged in a single logical unit. At step 1410, each logical unit comprising multiple SCC nodes having individual ranks is assigned a rank. At step 1412, structural defects in each logical unit are measured. In various embodiments of the present invention, the step of measurement of structural defect comprises aggregating all the structural defects of each SCCG node in a logical unit to arrive at a single value. At step 1414, logical unit with maximum structural defects is identified and is ranked 'R'. At step 1416, all logical units with rank greater than or equal to 'R' are selected. At step 1418, an empty module is created. At step 1420, all the elements in the selected logical units are transferred to empty module.

Figure 15:
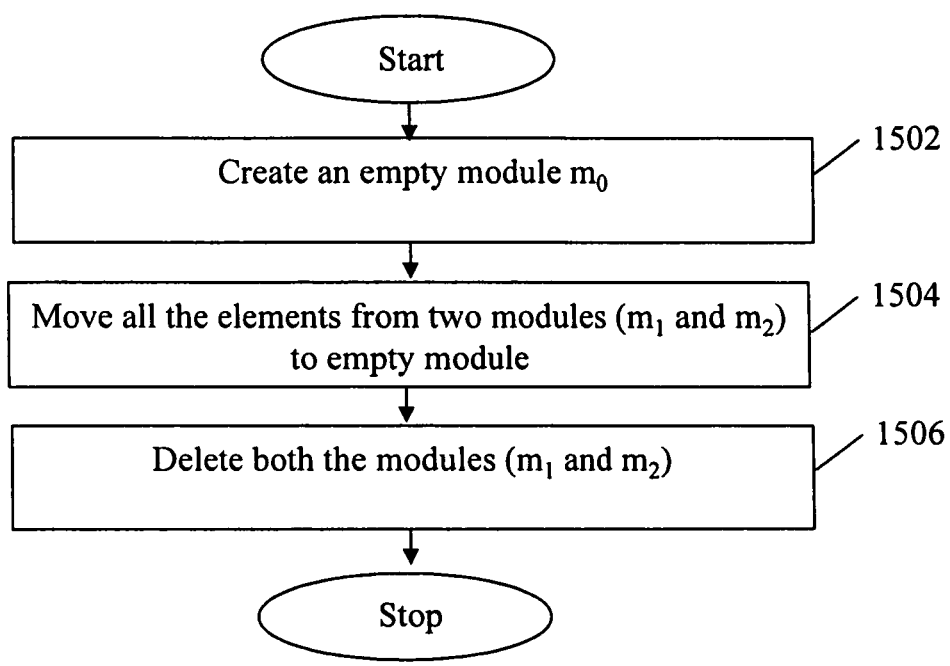
FIG. 15 illustrates a method of merging module employed as a prescription step for improving modularity in a software system.

FIG. 15 illustrates a method of merging module employed as a prescription step in the present invention. At step 1502, an empty module ($m_0$) is created. At step 1504, all the elements from the two modules ($m_1$ and $m_2$) which need to be merged are moved to empty module. At step 1506, both the modules ($m_1$ and $m_2$) are deleted as all the elements from the two modules have been copied to empty module resulting in merger of two modules.

Figure 16:
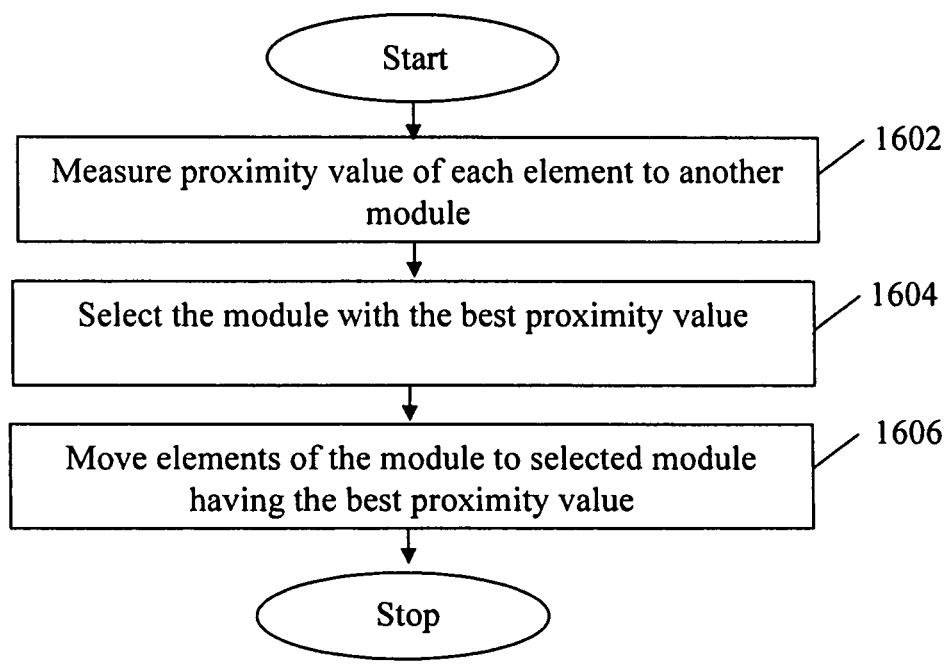
FIG. 16 illustrates a method of merging module when a single module is provided.

FIG. 16 illustrates a method of merging module when a single module is provided. At step 1602, proximity value of each element of a module is measured to another module. In various embodiments of the present invention, proximity value is used to measure the closeness or belongingness between two entities.

At step 1604, the module with the best 'proximity value' is selected for each element. At step 1606, elements of module are moved to selected module having the best proximity value.

In an embodiment of the present invention, proximity between a given function 'f' and a given module 'm' is as follows:

Proximity_value(f,m)=((conceptual_proximity(f,m)+Structural_proximity(f,m))/2

Where conceptual proximity and structural proximity is as follows:

Conceptual_proximity(f,m)=1−(KL(p(f),p(m))+KL(p(m),p(f)))/2

Where KL(p(f), p(m)) is the Kullbak-Leibler divergence between the probability distributions f and p.

$$\text{Structural\_proximity}(f, m) = \frac{\frac{\text{incalls}(f, m)}{\text{incalls}(f)} + \frac{\text{outcalls}(f, m)}{\text{outcalls}(f)} + \frac{\text{used}(f, m)}{\text{used}(f)}}{3}$$

Where
incalls (f) are set of functions that call f;
outcalls (f) are set of functions that are called by f;
incalls (f, m) are subset of incalls (f) such that each function belongs to module m;
outcalls (f, m) are subset of outcalls (f) such that each function belongs to module m;
used (f) are set of data-types used by f; and
used (f, m) are subset of used(f) such that each data-type belongs to module m.

The present invention may be implemented in numerous ways including as a system, a method, or a computer readable medium such as a computer readable storage medium or a computer network wherein programming instructions are communicated from a remote location.

The system, method and computer program product for improving modularity as described herein is particularly well suited for large legacy software systems, however, may be applied to various systems in other domains by performing minor modifications as would be apparent to a person of skill in the art.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:
1. A computer system for improving modularity of a software source code, comprising:
i. a user interface for receiving source code;
ii. a source code model extractor for parsing and forming a model of the source code;
iii. a source code model database for storing the source code model, refactoring operators, and a record of refactoring changes, wherein:
each refactoring operator comprises a defined source code function, and each refactoring change comprises an alteration to the source code such that external behavior of the source code subsequent to alteration conforms to external behavior of the source code prior to alteration; and
the source code model database is stored in a non-transitory memory;
iv. a modularization diagnosis reader for evaluating modularity of the source code and generating a modularity problem diagnosis data, wherein the modularity prob- lem diagnosis data comprises information corresponding to identified modularity problems;

v. a modularity improvement analyzer for reading the source code model and modularity problem diagnosis data and generating a set of prescriptions, the set of prescriptions comprising a list of operations for improving modularity of the source code;

vi. an optimal improvement suggestion selector for evaluating and electing one or more prescriptions from the set of prescriptions, based on a predetermined criteria; and vii. a refactoring engine for receiving selected prescriptions and applying them on the source code;

wherein modularity is a logical partitioning of the software source code into software modules, each module comprising a logical unit.

2. The system as claimed in claim 1, further comprising a model annotator module for reflecting modularity defects on graphs via colored nodes and edges.

3. The system as claimed in claim 1, wherein the source code is any computer programming file that is human readable and can be converted to machine readable form.

4. The system as claimed in claim 1, wherein the source code model comprise file information, function information, function dependency information, global variable information, data structure information, dependency between global variables and functions, data structures and functions, and other programming constructs.

5. The system as claimed in claim 1, wherein modularization diagnosis reader applies the extracted source code model and architectural description document of the source code for evaluating modularity of the source code.

6. The system as claimed in claim 1, wherein multiple metrics are used to evaluate the modularity of source code from various perspectives such as structure, size, concept, and architecture.

7. The system as claimed in claim 5, wherein the architectural description document stores critical information on source code such as description of modules, description of layers, and architectural constraints.

8. The system as claimed in claim 2, wherein the nodes and edges are colored with different strengths depending upon the number and severity of modularity defects.

9. The system as claimed in claim 1, wherein the modularity improvement analyzer further comprises:

i. a structural modularity improvement analyzer for examining modularity problem diagnosis data and providing a list of prescription from structural perspective;

ii. a size modularity improvement analyzer for examining modularity problem diagnosis data and providing a list of prescriptions from size perspective;

iii. an architectural modularity improvement analyzer for examining modularity problem diagnosis data and providing a list of prescriptions from architectural perspective;

iv. a functional concept modularity improvement analyzer for examining modularity problem diagnosis data and providing a list of prescriptions from functional concept perspective;

v. a rule engine for storing and executing rules; and vi. an improvement rule base for defining rules in a specific format for each modularity operator.

10. The system as claimed in claim 1, wherein the optimal improvement suggestion selector module further comprises:

i. an improvement suggestion selector module for receiving a prescription list from improvement analyzer module;

ii. a refactoring history repository for archiving prescription recommended for previous source code along with defects and gain suggested for various modules; and iii. a conflict resolution heuristics for assessing prescriptions and its effect on modularity.

11. The system as claimed in claim 1, wherein the refactoring engine further comprises:

i. a refactoring operator repository for storing refactoring operators employed to improve source code modularity;

ii. a refactoring history repository for recording all refactoring applied to the source code; and iii. a code refractor for interpreting prescription in terms of refactoring operators from the refactoring history repository and applying them on source code model.

12. The system as claimed in claim 1, wherein the refactoring engine retrieves a set of refactoring operators from source code model database and implement the changes to source code as suggested by the optimal improvement suggestion selector module.

13. The system as claimed in claim 1, wherein refactoring engine does not alter the external behavior of the source code but improves its internal structure.

14. A method for providing suggestions for improving modularity of software system, the method comprising the steps of:

i. receiving a source code;

ii. parsing the source code for creating a model of the source code;

iii. storing the source code model, refactoring operators, and a record of refactoring changes, wherein each refactoring operator comprises a defined source code function, and each refactoring changes comprises an alteration to the source code such that external behavior of the source code subsequent to alteration conforms to external behavior of the source code prior to alteration;

iv. performing modularity analysis using the source code model and architectural description document of source code;

v. identifying structural, architectural, conceptual, and size based modularity defects in the source code;

vi. generating a modularity problem diagnosis data, wherein the modularity problem diagnosis data comprises information corresponding to identified modularity problems;

vii. generating a set of prescriptive suggestions for each defect, the set of prescriptive suggestions comprising a list of operations for improving modularity of the source code;

viii. evaluating effect of each prescriptive suggestion on overall software modularity of the source code; and ix. selecting optimal prescriptive suggestions from the set of prescriptive suggestions based on a predetermined criteria, and presenting the optimal prescriptive suggestions to user via user interface;

wherein modularity is a logical partitioning of the software source code into software modules, each module comprising a logical unit.

15. The method of claim 14, wherein the step of generating prescriptions further comprises the step of generating architectural prescriptions for removing architectural defects from software system.

16. The method of claim 14, wherein the step of generating prescriptions further comprises the step of generating size and conceptual prescriptions for removing size and conceptual defects from software system.

17. The method of claim 14, wherein the step of generating structural prescriptions further comprises the step of generating structural prescriptions for removing structural defects from software system.

18. The method of claim 15, wherein the step of generating architectural prescriptions for removing architectural defect comprises the steps of:
   i. selecting an architectural defect from a source code file;
   ii. determining whether the architectural defect is a back call defect;
   iii. applying break cycle strategy, if the architectural defect is not a back call defect;
   iv. determining whether called function belongs to a called module, if architectural defect is a back call defect;
   v. applying break dependency strategy, if the called function does not belongs to called module;
   vi. applying split module strategy, if the called function belongs to called module; and
   vii. generating and filtering all prescriptions for back call defect.

19. The method of claim 16, wherein the step of generating size and conceptual prescriptions for removing size and conceptual defects comprises the steps of:
   i. selecting a conceptually non-cohesive module;
   ii. determining whether the non-cohesive module has dominant concepts;
   iii. determining whether the non-cohesive module is a utility module, if non cohesive module does not have dominant concepts;
   iv. reporting to the user, if the non-cohesive module is not a utility module;
   v. determining whether the non-cohesive module has size defect, if non-cohesive module has dominant concepts;
   vi. applying split module strategy, if the non-cohesive module has size defect;
   vii. determining whether the non-cohesive module has conceptually divergent methods, if the non-cohesive module does not have size defect;
   viii. selecting conceptually non-cohesive method, if the module has conceptually divergent concepts;
   ix. applying strategy to move method; and
   x. generating and filtering size and conceptual prescriptions.

20. The method of claim 17, wherein the step of generating structural prescriptions for removing structural defects comprises the steps of:
   i. selecting a structural defect from a source code file;
   ii. determining whether the structural defect is non API method call defect;
   iii. processing direct state access, if the structural defect is non API method call defect;
   iv. determining whether the called function belongs to called module, if the structural defect is an API method call defect;
   v. applying break dependency strategy, if called function does not belong to called module; and
   vi. applying make API strategy, if the called function belongs to called module.

21. The method of claim 18, wherein the steps of identifying critical dependencies for breaking the module dependency cycle comprises the step of:
   i. collecting functional call edge and direct state access edge for each module;
   ii. computing critical dependency magnitude for each module dependency edge;
   iii. iterating over critical dependencies in order of descending CDM values;
   iv. selecting the module with the highest critical dependency value;
   v. iterating over functional call dependencies of module with highest critical dependency;
   vi. calling break function call dependency strategy;
   vii. iterating over direct access dependencies of module with highest critical dependency module;
   viii. calling break direct access strategy;
   ix. determining whether critical dependency strategy is broken;
   x. repeating steps (iii)-(ix), if the critical dependency strategy is not broken.

22. The method of claim 18, wherein the step of performing module splitting comprises the steps of:
   i. selecting a module from a source code file;
   ii. determining whether the module has dominant concepts;
   iii. performing conceptual module splitting, if module has multiple dominant concepts;
   iv. performing structural module splitting, if the module does not have multiple dominant concepts.

23. The method of claim 19, wherein the step of performing conceptual module splitting comprises the steps of:
   i. emptying a selected element list;
   ii. selecting modules belonging to multiple dominant concepts;
   iii. adding elements of the module belonging to multiple dominant concepts to selected element list;
   iv. computing the total size of selected element list;
   v. determining if the total size of selected element list is between lower and upper size of threshold;
   vi. repeating steps (ii-v) if the total size of the selected element list is not between lower and upper size of threshold;
   vii. creating an empty module if the total size of selected element list is between lower and upper size of threshold; and
   viii. moving the selected elements to empty module.

24. The method of claim 14, wherein the step of evaluating prescriptions further comprises the step of evaluating the effect of each prescription on structural, architectural, conceptual, and size modularity.

25. A computer program product comprising a non-transitory computer usable medium having a computer readable program code embodied therein for improving modularity of software system, the computer program product comprising:
   program instructions for receiving a source code;
   program instructions for parsing the source code for creating a model of the source code;
   program instructions for storing the source code model, refactoring operators, and a record of refactoring changes, wherein each refactoring operator comprises a defined source code function, and each refactoring change comprises an alteration to the source code such that external behavior of the source code subsequent to alteration conforms to external behavior of the source code prior to alteration;
   program instructions for evaluating modularity of the source code and generating modularity problem diagnosis data, wherein the modularity problem diagnosis data comprises information corresponding to identified modularity problems;
   program instructions for identifying structural, architectural, conceptual, and size based modularity defects in the source code;
   program instructions for generating a set of prescriptive suggestions for each defect, the set of prescriptive suggestions comprising a list of operations for improving modularity of the source code;

program instructions for evaluating effect of each prescriptive suggestion on overall software modularity of the source code; and program instructions for selecting optimal prescriptive suggestions from the set of prescriptive suggestions based on a predetermined criteria, and presenting the optimal prescriptive suggestions to user via user interface;

wherein modularity is a logical partitioning of the software source code into software modules, each module comprising a logical unit.

26. The computer program product of claim 25, further comprising:

program instructions for performing modularity analysis using the source code model and architectural description document of source code; and program instructions for identifying structural, architectural, conceptual, and size based modularity defects in the source code.

27. The computer program product of claim 26, further comprising program instructions for generating size and conceptual prescriptions for removing size and conceptual defects from software system.

28. The computer program product of claim 26, further comprising program instructions for generating structural prescriptions for removing structural defects from software system.

29. The computer program product of claim 26, further comprising program instructions for generating architectural prescriptions for removing architectural defects from software system.

30. The computer program product of claim 27, wherein the program instructions for removing size and conceptual defect comprise:

program instructions for selecting a conceptually non-cohesive module;

program instructions for determining whether the non-cohesive module has dominant concepts;

program instructions for determining whether the non-cohesive module is a utility module, if non cohesive module does not have dominant concepts;

program instructions for reporting to the user, if the non-cohesive module is not a utility module;

program instructions for determining whether the non-cohesive module has size defect, if non-cohesive module has dominant concepts;

program instructions for applying split module strategy, if the non-cohesive module has size defect;

program instructions for determining whether the non-cohesive module has conceptually divergent methods, if the non-cohesive module does not have size defect;

program instructions for selecting conceptually non-cohesive method, if the module has conceptually divergent concepts;

program instructions for applying strategy to move method; and program instructions for generating and filtering size and conceptual prescriptions.

31. The computer program product of claim 28, wherein the program instructions for removing structural defect comprise:

program instructions for selecting a structural defect from a source code file;

program instructions for determining whether the structural defect is non API method call defect;

program instructions for processing direct state access, if the structural defect is non API method call defect;

program instructions for determining whether the called function belongs to called module, if the structural defect is an API method call defect;

program instruction means for applying break dependency strategy, if called function does not belong to called module; and program instructions for applying make API strategy, if the called function belongs to called module.

32. The computer program product of claim 29, wherein the program instructions for removing architectural defect comprises:

program instructions for selecting an architectural defect from a source code file;

program instructions for determining whether the architectural defect is a back call defect;

program instructions for applying break cycle strategy, if the architectural defect is not a back call defect;

program instructions for determining whether called function belongs to a called module, if architectural defect is a back call defect;

program instructions for applying break dependency strategy, if the called function does not belongs to called module;

program instructions for applying split module strategy, if the called function belongs to called module; and program instructions for generating and filtering all prescriptions for back call defect.

* * * * *